(12) United States Patent
Sato et al.

(10) Patent No.: US 8,443,847 B2
(45) Date of Patent: May 21, 2013

(54) ELECTRIC WIRE END TREATMENT DEVICE AND ELECTRIC WIRE END TREATMENT METHOD TECHNICAL FIELD

(75) Inventors: Naoki Sato, Shiga (JP); Shizuka Yamaguchi, Shiga (JP); Etsuro Kihara, Shiga (JP); Takayuki Okubo, Shiga (JP); Kazuhiro Kurokawa, Shiga (JP); Toshiyuki Tanaka, Shiga (JP)

(73) Assignees: Furukawa Electric Co., Ltd, Tokyo (JP); Furukawa Automotive Systems Inc., Shiga (JP)

( * ) Notice: Subject to any disclaimer, the term of this patent is extended or adjusted under 35 U.S.C. 154(b) by 0 days.

(21) Appl. No.: 13/230,806

(22) Filed: Sep. 12, 2011

(65) Prior Publication Data
US 2012/0060964 A1    Mar. 15, 2012

Related U.S. Application Data

(63) Continuation of application No. PCT/JP2010/056382, filed on Nov. 19, 2009.

(30) Foreign Application Priority Data

| Apr. 10, 2009 | (JP) | 2009-095642 |
| Apr. 20, 2009 | (JP) | 2009-101779 |
| Jul. 10, 2009 | (JP) | 2009-233271 |
| Mar. 31, 2010 | (JP) | 2010-081041 |

(51) Int. Cl.
*B21F 1/00*    (2006.01)

(52) U.S. Cl.
USPC ............. 140/105; 140/92.1; 72/307; 29/33 M

(58) Field of Classification Search
USPC .............. 140/112, 93 R, 92.1, 105, 139, 140; 29/564.6, 564.8, 566.2, 33 M; 72/134, 306, 72/307
See application file for complete search history.

(56) References Cited

U.S. PATENT DOCUMENTS 4,715,099 A * 12/1987 Yoshida ..................... 29/33 M
5,996,223 A * 12/1999 Ogawa et al. ................ 29/861

FOREIGN PATENT DOCUMENTS

| JP | H06-223646 A | 8/1994 |
| JP | 2004-220977 A | 8/2004 |
| JP | 2009-32530 A | 2/2009 |
| WO | 96-24179 | 8/1996 |

OTHER PUBLICATIONS

International Search Report for International Application No. PCT/JP2010/056382, mailing date Jul. 13, 2010, 1 pages.

* cited by examiner

*Primary Examiner* — Dana Ross
*Assistant Examiner* — Matthew G Katcoff
(74) *Attorney, Agent, or Firm* — Turocy & Watson, LLP

(57) ABSTRACT

An end treatment portion 1*a* which treats ends Wa and Wb of an electric wire W and a transfer portion 7 which transfers the electric wire W are provided; a discharge portion 6, which discharges the electric wire W which is subjected to an end treatment by the end treatment portion 1*a* and transferred by the transfer portion 7, is also provided; the discharge portion 6 includes a discharge beam 11 for securing the electric wire W in a predetermined arrangement pattern; a calculation portion 20, which controls a securing treatment for securing the electric wire W to the discharge beam 11 in the discharge portion 6, is provided; and the predetermined arrangement pattern is set by the calculation portion 20 based on a content of processing the electric wire W at a subsequent process.

5 Claims, 19 Drawing Sheets

ELECTRIC WIRE END TREATMENT DEVICE AND ELECTRIC WIRE END TREATMENT METHOD TECHNICAL FIELD

CROSS REFERENCE TO RELATED APPLICATIONS

This is a Continuation Application of PCT Application No. PCT/JP2010/056382, filed Apr. 8, 2010, which was published under PCT Article 21 (2) in Japanese.

This application is based upon and claims the benefit of priority from prior Japanese Patent Application No. 2009-095642, filed Apr. 10, 2009; Japanese Patent Application No. 2009-101779, filed Apr. 20, 2009; Japanese Patent Application No. 2009-233271, filed Oct. 7, 2009; and, Japanese Patent Application No. 2010-081041, filed Mar. 31, 2010, the entire contents of each application listed above are incorporated herein by reference.

TECHNICAL FIELD

The present invention relates to an electric wire end treatment device and an electric wire end treatment method.

BACKGROUND ART

In a wire harness used for automobiles and the like, a plurality of electric wires, which are formed of insulated electric wire conductors, are bound to each other, connecting terminals are arranged on electric wire ends, and further, the connecting terminals are accommodated in a connector housing to form a connector.

Conventionally, a wire harness is manufactured by being subjected to processes of electric wire cutting, removing coating of ends, connecting terminals (crimping or pressure welding), and inserting connectors, in this order.

Among the above-mentioned processes, a cutting process for an electric wire is a process to cut an electric wire one by one to have a predetermined length. The coating removing process for an end is a process to expose an electric wire conductor by removing a part of an insulating coating. Further, the terminal connecting process is a process of crimping or pressure welding terminals to an exposed electric wire conductor. In a case of pressure welding, sometimes, a terminal can be connected to an electric wire conductor even an insulating coating remains thereon.

The connector inserting process is the process of repeating collecting predetermined electric wires with terminals for each wire harness and inserting the terminals into a predetermined position in the connector housing. After the connector inserting process, the bound electric wires are finally secured with a tape or the like to form a set of wire harness. The processes are performed manually or with automated machines. Patent Document 1 as mentioned below discloses an example of manufacturing a wire harness.

Among the processes as described above, in the electric wire end treatment process from the electric wire cutting process to the terminal connecting process, changeover of a supply portion for electric wires and/or a supply portion for components to be assembled such as terminals and the like, and a connecting portion (crimping portion) for connecting (crimping) components to be assembled such as terminals to the ends is performed so as to handle manufacturing multiple types of electric wires which are treated at ends.

Conventionally, in order to mitigate temporal load and/or operational load required for the changeover as mentioned above, in general, so-called a lot production method is employed. In this method, multiple wires are collectively subjected to end treatment for every type of electric wires which will be required, and electric wires subjected to the end treatment are temporarily stored as a middle stock.

In the lot production method, for example, as in a manufacturing process for wire harnesses shown in FIG. 19, multiple types (two types in the figure) of electric wires are respectively manufactured by the changeover using multiple (three in the figure) electric wire end treatment devices. In FIG. 19, the electric wire end treatment devices manufacture electric wires W1, W3, and W5, which have different lengths, different types of terminals connected thereto, and the like. Then, after the changeover, they further manufacture electric wires W2, W4, and W6 of different types.

Next, when the end treatment process in the electric wire end treatment device is finished, the electric wires W1 through W6 are sorted and temporarily stored in predetermined storage spaces provided in a factory for each of the type. The temporarily stored electric wires W1 through W6 are moved to a subsequent process by a worker who manually retrieves a necessary one from the stored multiple types of electric wires.

A process subsequent to the electric wire end treatment process may be, for example, a twisting process for twisting a multiple electric wires to entangle, a jointing process for connecting ends of multiple wire harnesses, a sub-assy process for previously integrating a part which form wire harnesses used one vehicle, and the like.

Actually, the above-mentioned electric wires W1 through W6 are moved to the sub-assy process after the twisting process, jointing process or the like, or directly to the sub-assy process, depending upon the types of the vehicles to which the wire harnesses are assembled and the like. A group of electric wires assembled in the sub-assy process are transferred on an assemble conveyer, subjected to processes such as connector inserting and the like, and then moved to a final assembling process for forming wire harnesses for one vehicle.

In the lot production method as described above, if a large number of types of the electric wires are stored the storing spaces, the operation to manually retrieve the electric wires W1 through W6 which will be required in the subsequent process of the electric wire end treatment process becomes complicated, and there is a risk that a worker erroneously retrieves different types of electric wires. For such a reason, manufacturing defects such as erroneous integration tend to occur.

Further, if the electric wires subjected to the end treatment are mounted without being organized based on their types, it takes time to find out a target electric wire for the subsequent process, or the electric wires tangle to each other, thereby making them difficult to be retrieved. Accordingly, the productivity has been low.

Patent Document 2 mentioned below discloses providing an electric wire supply shelf for sorting the electric wires subjected to the end treatment into different types and storing them in a storage space provided adjacent to the electric wire end treatment device. In the Patent Document 2 mentioned below, a plurality of holders for accommodating sorted electric wires for different types are set to the electric wire supply shelf. A lid is provided for each holder, and only a lid corresponding to an electric wire which will be required at the subsequent process is automatically opened in order to suppress erroneous assembly.

Prior Art Documents

Patent Documents

Patent Document 1: International Patent Publication 96/24179 pamphlet
Patent Document 2: Laid-open Patent Publication No. 6-223646

SUMMARY OF THE INVENTION

Problems to be Solved by the Invention

The lot production method, even the conventional art disclosed in the above-mentioned Patent Document 2, requires a storage space for sorting the electric wires subjected to the end treatment into different types and storing them as described above. Accordingly, there is a problem that, as a scale of a factory, process, and/or production increases, the storage space also increases and a space efficiency deteriorates.

Further, for getting all of a set of electric wires which form a wire harness, it is necessary to select required ones from a wide variety of the electric ends which are subjected to the end treatment and which are sorted in the different types previously, and gather all for the set. Thus, so-called waiting-for-material occurs in the subsequent process, and as a result, a lead time becomes long.

Furthermore, in a case where a wide-variety, small-lot production of the wire harness is required, the number of types of the electric wires increases. Thus, the lot production method as described above has a problem that the middle stock of the electric wires stored in the storing space becomes large since a wide variety of electric wires have to be manufactured previously while the production volume is small.

An objective of the present invention is to provide an electric wire end treatment device and an electric wire end treatment method which can reduce a space of a manufacturing place and a lead time between an electric wire end treatment process and a subsequent process, and can be readily applied to a wide-variety, small-lot production of electric wires.

Means for Solving the Problems

An electric wire end treatment device according to the present invention is an electric wire end treatment device including an end treatment portion which treats ends of an electric wire and a transfer portion which transfers the electric wire, the electric wire end treatment device, which also includes a discharge portion which discharges the electric wire which is subjected to an end treatment by the end treatment portion and transferred by the transfer portion, and in which the discharge portion includes securing means for securing the electric wire in a predetermined arrangement pattern, a calculation portion, which controls a securing treatment for securing the electric wire to the securing means in the discharge portion, is provided, and the predetermined arrangement pattern is set by the calculation portion based on a content of processing the electric wire at a subsequent process.

In one embodiment of the present invention, a plurality of engaging portions for engaging end portions of the electric wire aligned in a parallel direction are arranged in the parallel direction in the securing means, the calculation portion sets an alignment pattern for the electric wire in the parallel direction as the arrangement pattern, and the electric wire is secured to the securing means in the alignment pattern in the discharge portion.

In one embodiment of the present invention, the parallel direction of the engaging portions and a transfer direction for the electric wire by the transfer portion are substantially identical directions.

In one embodiment of the present invention, a plurality of discharge chucks, which holds both ends of the electric wire transferred by the transfer portion and performs a discharge treatment at the discharge portion under control of the calculation portion, are provided between the transfer portion and the discharge portion, the discharge chucks are provided substantially horizontally and parallel in a direction substantially vertical to the transfer direction, and the discharge chucks secure the electric wire to the securing means in a folded state by overlapping and securing the both ends of the electric wire at the same positions in the parallel direction.

One embodiment of the present invention includes a recording portion which records electric wire processing information relates to the content of processing the electric wire at the subsequent process, in which the calculation portion sets the predetermined arrangement pattern based on the electric wire processing information, and the end treatment portion and the transfer portion are controlled by the calculation portion based on the electric wire processing information.

In one embodiment of the present invention, an end treatment for each of electric wires by the end treatment portion is controlled by the calculation portion based on the electric wire processing information.

In one embodiment of the present invention, the end treatment portion includes treating means for performing a treatment for the electric wire in accordance with an end treatment pattern, and the treating means is controlled by the calculation portion based on the electric wire processing information.

In one embodiment of the present invention, the recording portion is secured to the securing means, a reading portion, which reads out the electric wire processing information from the recording portion, is provided, and the securing treatment is controlled by the calculation portion based on the electric wire processing information read out by the reading portion.

An electric wire end treatment method according to the present invention is an electric wire end treatment method which performs an end treatment for treating ends of an electric wire, and a transfer treatment for transferring the electric wire, the electric wire end treatment method, in which a discharge treatment for discharging the electric wire which is subjected to the end treatment and transferred by the transfer treatment is performed, and a securing treatment for securing the electric wire in an arrangement pattern set based on a content of processing the electric wire at a subsequent process is performed in the discharge treatment.

EFFECT OF THE INVENTION

According to the present invention, an electric wire end treatment device and an electric wire end treatment method which can reduce a space of a manufacturing place and a lead time between an electric wire end treatment process and a subsequent process, and can be readily applied to a wide-variety, small-lot production of electric wires can be provided.

DESCRIPTION OF EMBODIMENTS

Figure 1:
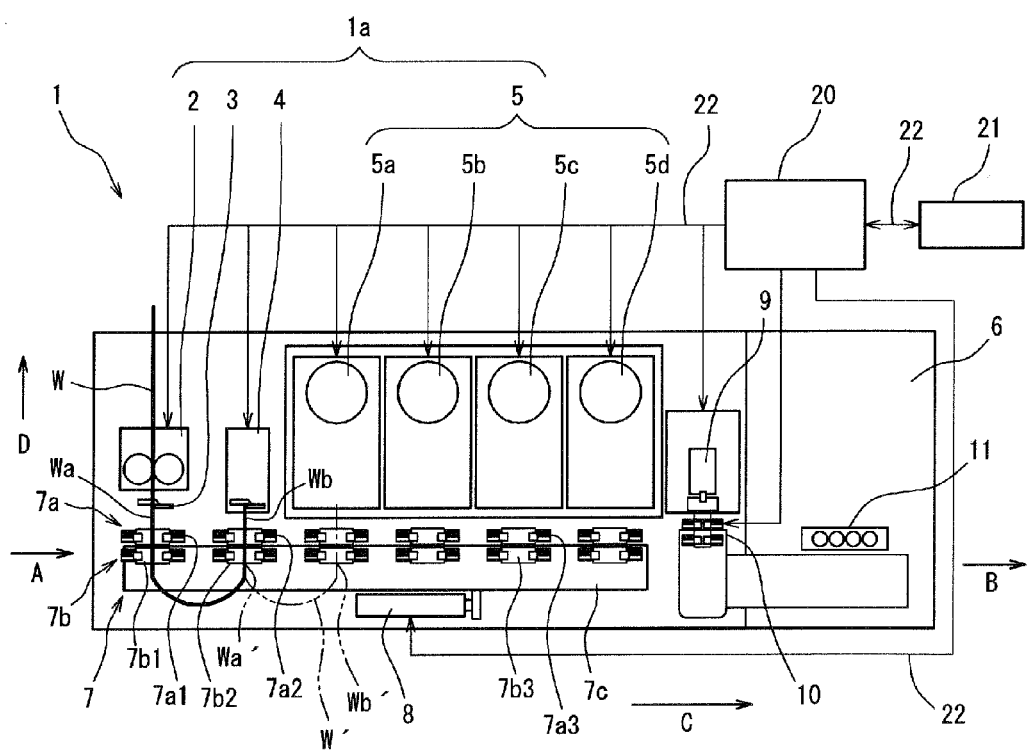
[FIG. 1] A plan view of an electric wire end treatment device according to an embodiment of the present invention.

As shown in FIGS. 1 through 8, an electric wire end treatment device 1 according to the present invention is an electric wire end treatment device 1 including an end treatment portion 1a (a measuring portion 2, a cutting portion 3, a strip portion 4, and a crimping portion 5) for treating ends of an electric wire W and a transfer portion 7 for transferring the electric wire W, which also includes a discharge portion 6 which discharges the electric wire W subjected to an end treatment by the end treatment portion 1a and transferred by the transfer portion 7. The discharge portion 6 includes a discharge beam 11 which secures the electric wire W in a predetermined arrangement pattern. The electric wire end treatment device 1 includes a calculation device 20 which controls a securing treatment for securing the electric wire W to the discharge beam 11 in the discharge portion 6. The calculation device 20 sets the predetermined arrangement pattern based on a content of processing the electric wire W at a subsequent process.

In the discharge beam 11, a plurality of engaging portions 11b, 11b, . . . for engaging end portions Wa, Wb, . . . of the electric wire W which are aligned in a parallel direction are arranged in the parallel direction. The calculation device 20 sets an alignment pattern of the electric wire W in the parallel direction as the arrangement pattern. The discharge portion 6 secures the electric wire W to the discharge beam 11 in the alignment pattern.

Herein, the parallel direction of the engagement portion 11b is the direction substantially identical to a transfer direction C for the electric wire W by the transfer portion 7.

A plurality of discharge chucks 10a and 10b for holding both ends Wa and Wb of the electric wire W transferred by the transfer portion 7 to perform discharge process at the discharge portion 6 under control of the calculation device 20 are provided between the transfer portion 7 and the discharge portion 6. The discharge chucks 10a and 10b are provided substantially horizontally and parallel to a direction substantially vertical to the transfer direction C of the transfer portion 7. The discharge chucks 10a and 10b secure the both ends Wa and Wb at the same position in the parallel direction such that they overlap each other. In this way, the electric wire W is secured to the discharge beam 11 in a folded state.

Furthermore, a memory device 21 for recording electric wire processing information related to the content of processing the electric wire W at the subsequent process in the end treatment process is provided. The calculation device 20 sets the predetermined arrangement pattern based on the electric wire processing information, and also, the calculation device 20 controls the end treatment portion 1a and the transfer portion 7 based on the electric wire processing information.

Further, the calculation device 20 controls the end treatment by the end treatment portion 1a for each of the electric wire W based on the electric wire processing information.

Furthermore, the end treatment portion 1a includes crimping devices 5a, 5b, 5c, and 5d as treatment means for treating the electric wire W in accordance with an end treatment pattern which will be described later. The calculation device 20 controls the crimping devices 5a, 5b, 5c, and 5d based on the electric wire processing information.

The embodiment of the present invention is described in details with reference to FIGS. 1 through 9.

Figure 2A:
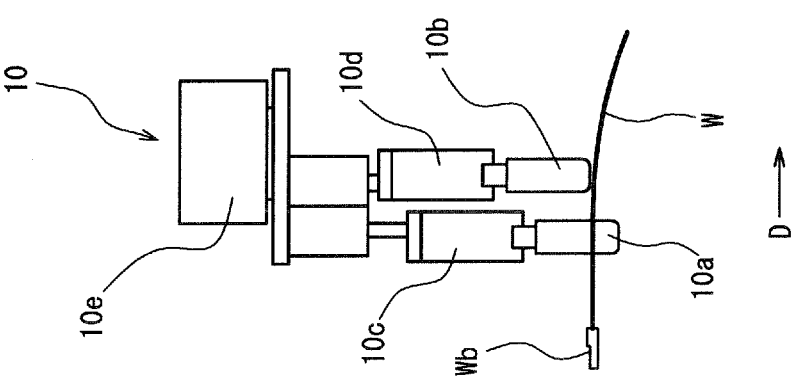
[FIG. 2] Illustrative diagrams of a discharge device of the electric wire end treatment device.
Figure 2B:
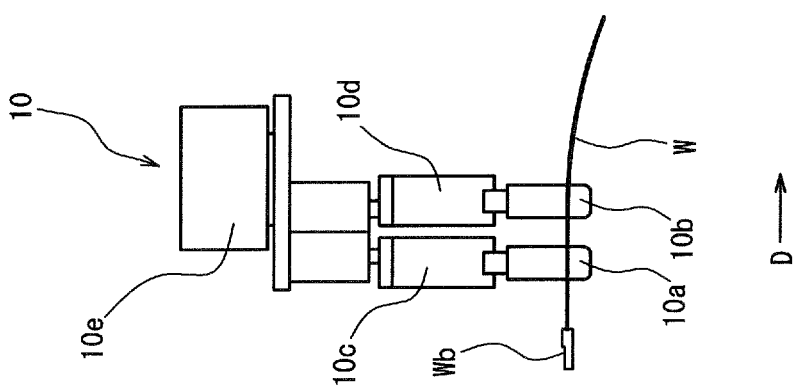
Figure 2C:
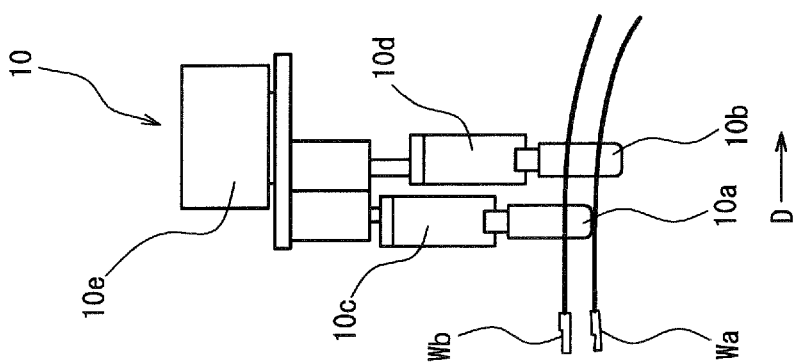
Figure 2D:
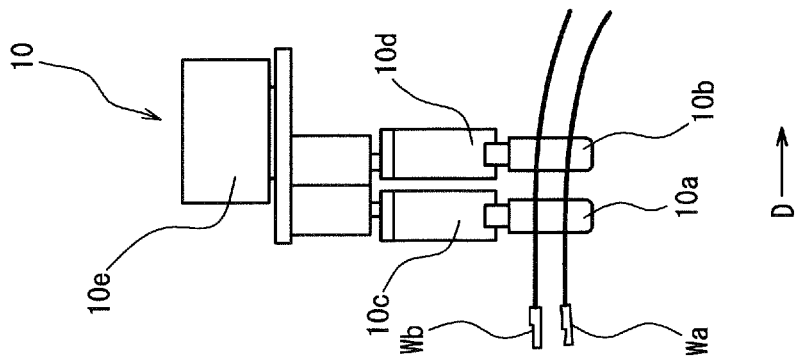

FIG. 1 is a plan view of the electric wire end treatment device 1 according to an embodiment of the present invention. FIG. 2 is an illustrative diagram showing a discharge device 10 of the electric wire end treatment device 1. Specifically, FIG. 2(a) is a diagram showing how a discharge cylinder 10c descends with the discharge chuck 10a being opened, and the discharge chuck 10a holds a discharge side end Wb. FIG. 2(b) is a diagram showing how a discharge cylinder 10c ascends with the discharge chuck 10b being opened and with the discharge chuck 10a holding the discharge side end Wb. FIG. 2(c) is a diagram showing how the discharge chuck 10b holds a supply side end Wa and the discharge side end Wb after the discharge cylinder 10d descends with the discharge chuck 10b being opened. FIG. 2(d) is a diagram showing how the discharge chuck 10a holds the supply side end Wa and the discharge side end Wb after the discharge chuck 10a once releases the discharge side end Wb, and then the discharge cylinder 10d ascends with the discharge chuck 10b holding the supply side end Wa and the discharge side end Wb.

Figure 3:
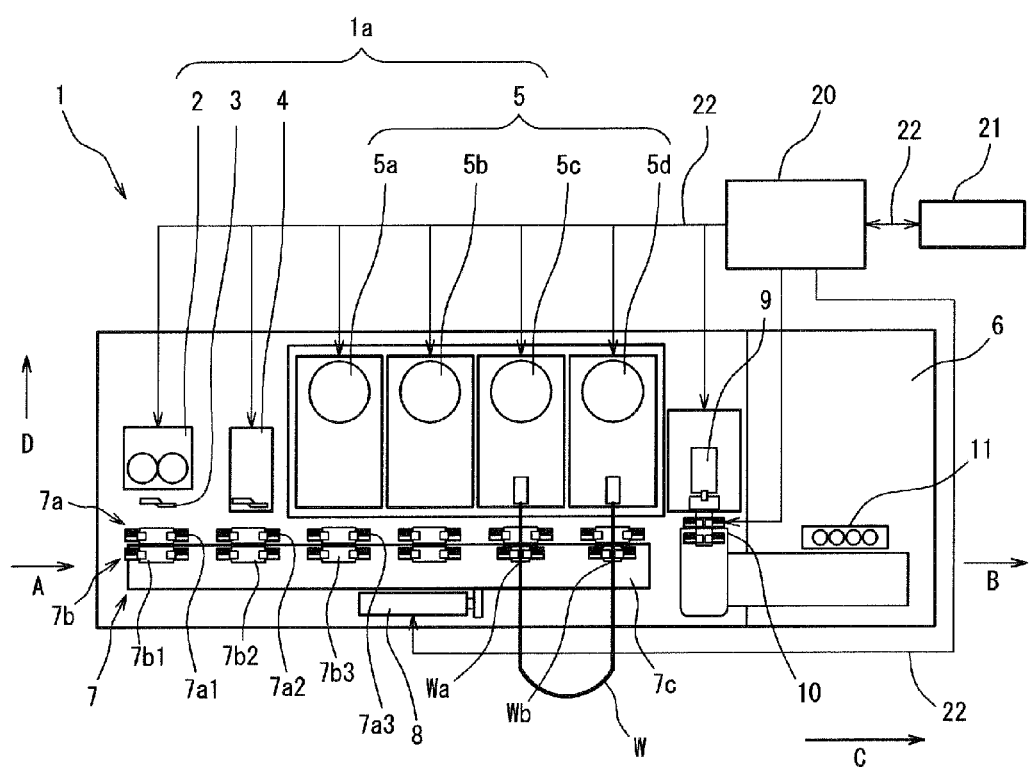
[FIG. 3] A plan view of the electric wire end treatment device showing an electric wire being supplied to a crimping portion.
Figure 4:
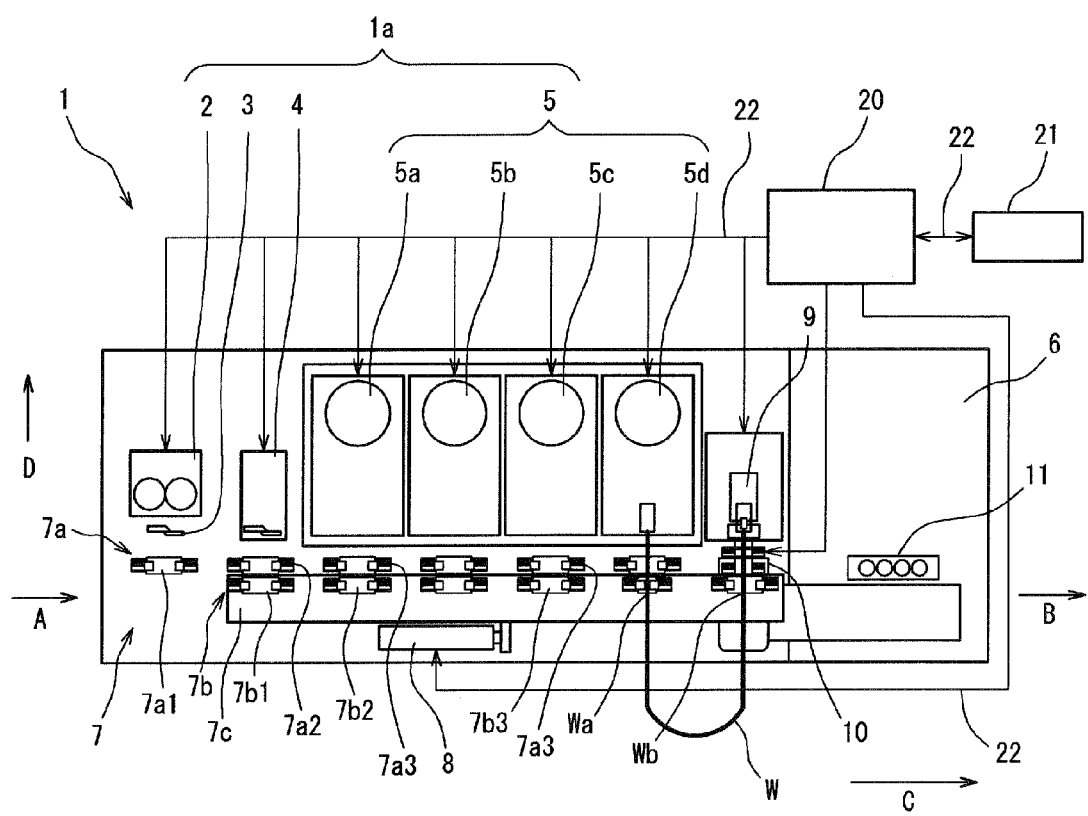
[FIG. 4] A plan view of the electric wire end treatment device showing the discharge device holding a discharge side end of the electric wire.
Figure 5:
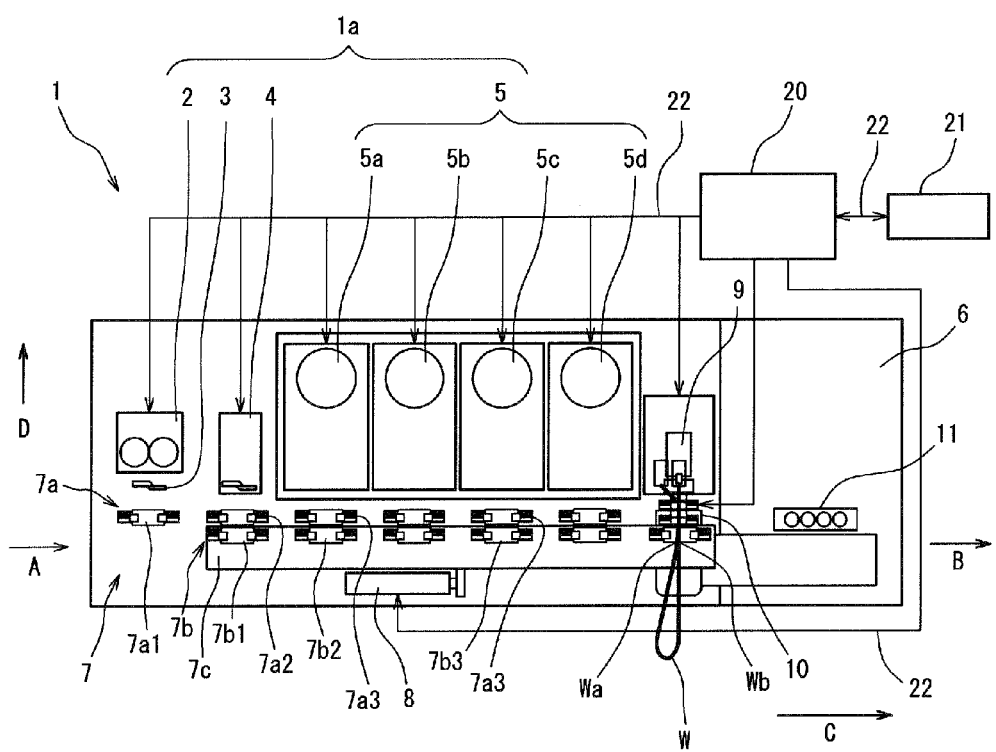
[FIG. 5] A plan view of the electric wire end treatment device showing the discharge device holding a supply side end and the discharge side end.

FIG. 3 is a plan view of the electric wire end treatment device 1 showing how the electric wire W is supplied to the crimping portion 5. FIG. 4 is a plan view of the electric wire end treatment device 1 showing how the discharge device 10 holds the discharge side end Wb of the electric wire W. FIG. 5 is a plan view of the electric wire end treatment device 1 showing how the discharge device 10 holds the supply side end Wa and the discharge side end Wb.

Figure 6:
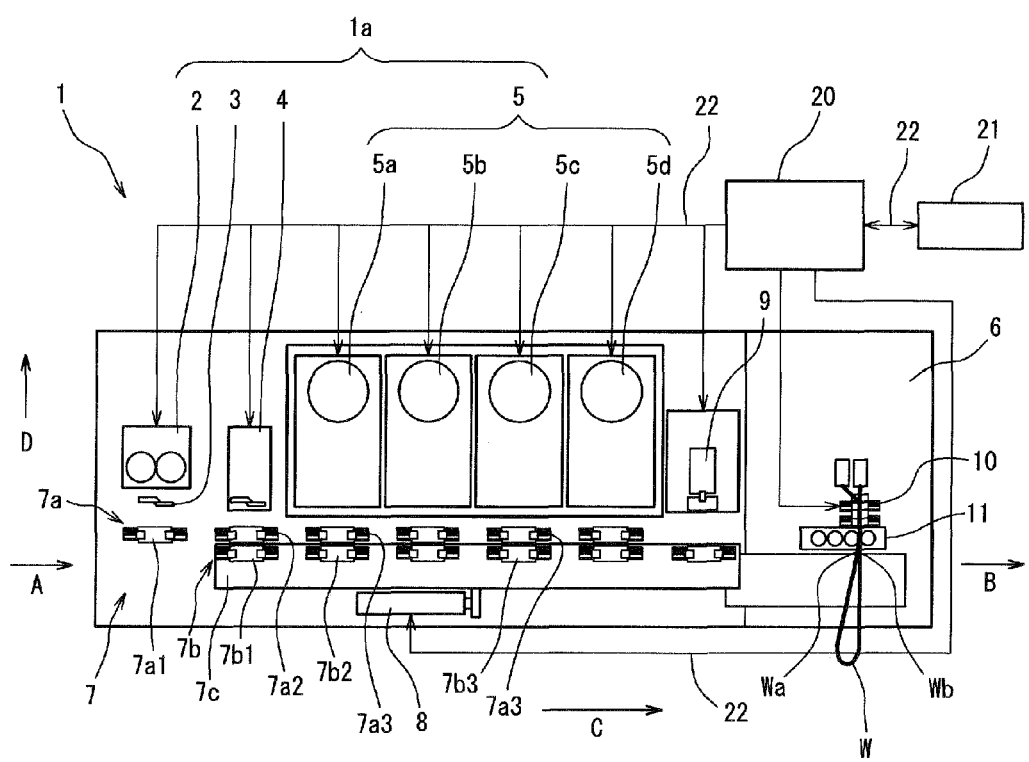
[FIG. 6] A plan view of the electric wire end treatment device showing the ends of the electric wire being secured to a discharge beam.
Figure 7:
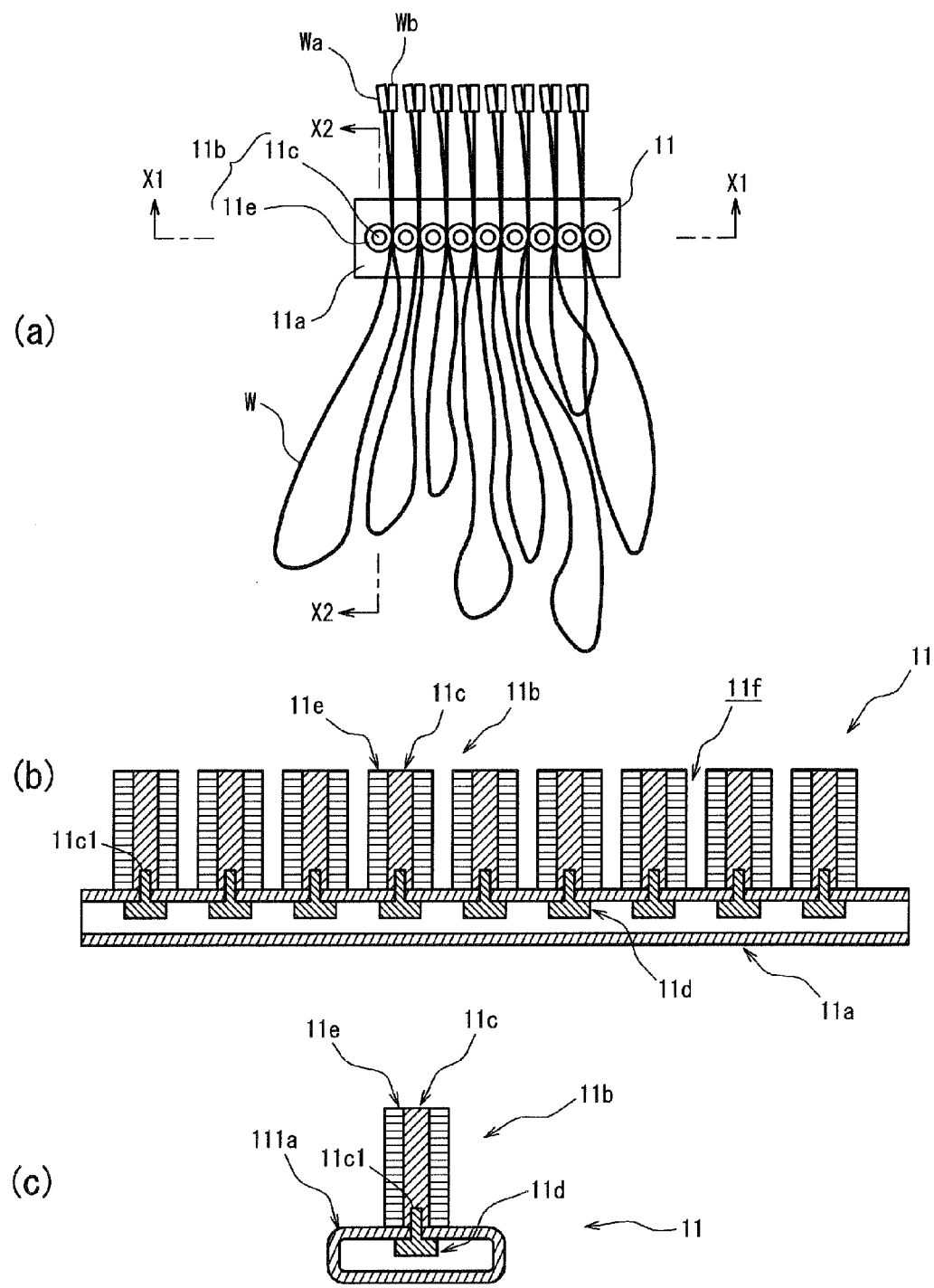
[FIG. 7] Diagrams showing a discharge beam and a state of securing electric wires thereto.

FIG. 6 is a plan view of the electric wire end treatment device 1 showing how the ends Wa and Wb of the electric wire W are secured to the discharge beam. FIG. 7 is a diagram showing the discharge beam 11 and how the electric wire W is secured thereto. Specifically, FIG. 7(a) is a plan view of the discharge beam 11, FIG. 7(b) is a cross-sectional view along X1-X1, and FIG. 7(c) is a cross-sectional view along X2-X2.

Figure 8:
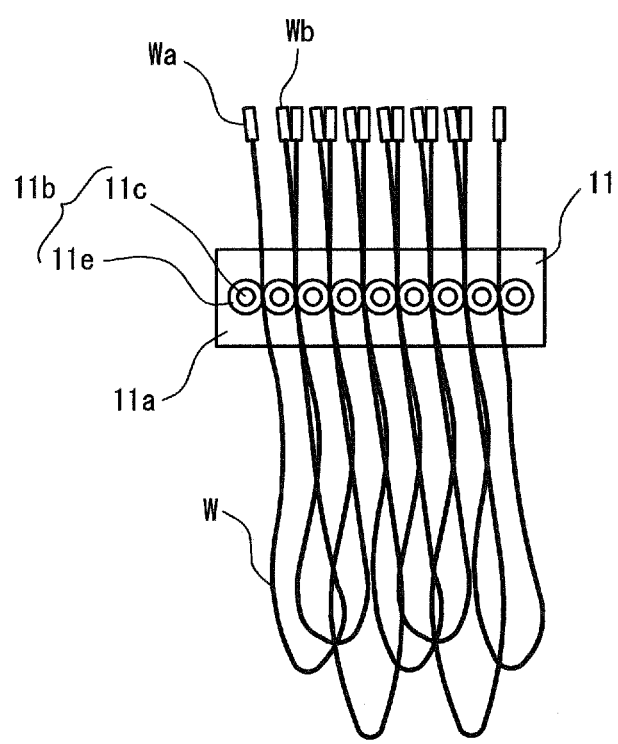
[FIG. 8] A plan view showing another state of securing electric wires to the discharge beam.
Figure 9:
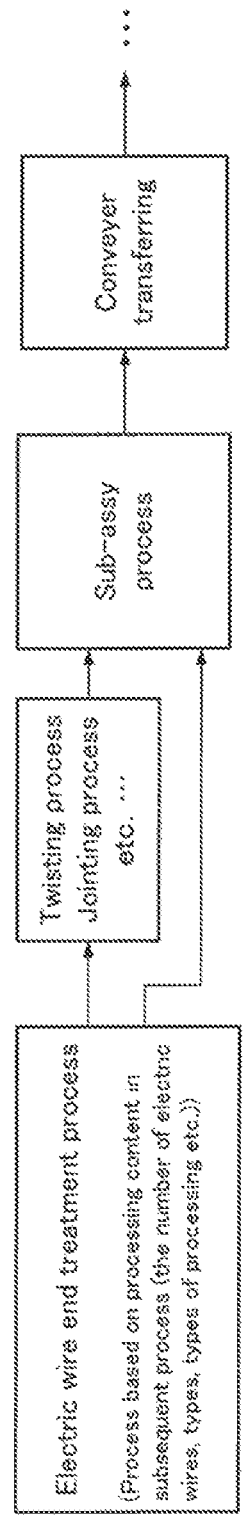
[FIG. 9] An illustrative diagram for illustrating a manufacturing process for wire harnesses using the electric wire end treatment device and an electric wire treatment method according to an embodiment of the present invention.

FIG. 8 is a plan view showing another example of securing the electric wire W to the discharge beam 11. FIG. 9 is an illustrative diagram for illustrating a manufacturing process for wire harnesses using the electric wire end treatment device 1 and the electric wire end treatment method according to the embodiment of the present invention.

In the electric wire end treatment device 1 shown in FIG. 1, the electric wire W is supplied to a measuring portion 2 which will be described later from an upper side in the Figure toward a lower side, and, through processes of measuring, cutting, connecting (crimping) and discharging which will be described later, the electric wire moves from an electric wire supply side A toward an electric wire discharge side B.

Herein, the electric wire W is formed of a conductor including a conducting line, and a non-conductive coating for coating the conductor. In the figures, the supply side end and the discharge side end of the electric wire W are respectively denoted by reference codes Wa and Wb.

The electric wire end treatment device 1 includes the measuring portion 2 for measuring electric wires, the cutting portion 3 for cutting the measured electric wires, the strip portion 4 for removing coatings of the ends Wa and Wb, the crimping portion 5 for crimping terminals to the ends Wa and Wb of the electric wire W from which coatings are removed, the discharge portion 6 for discharging the crimped electric wires, the transfer portion 7 for moving the electric wire W from the measuring portion 2 to the discharge portion 6, a transferring actuator 8 for driving the transfer portion 7, a temporary holding chuck 9 for discharging the electric wire W transferred by the transfer portion 7 after the crimping process to the discharge portion 6, a discharge device 10 for receiving the ends Wa and Wb from the temporary holding chuck 9 and moving them toward the discharge portion 6, the calculation device 20 for sending control signals which control the components (the measuring portion 2, the cutting portion 3, the strip portion 4, the crimping portion 5, the transfer portion 7 (the transferring actuator 8), the temporary holding chuck 9, and the discharge device 10), the memory device 21 for storing electric wire processing information which will be described later, and a cable 22 for communicating the control signals. In the present embodiment, among the above-described components, the measuring portion 2, the cutting portion 3, the strip portion 4, and the crimping portion 5 form the end treatment portion 1a which performs end treatment for electric wires.

Among such components, the crimping portion 5 includes a plurality of crimping devices 5a, 5b, 5c, and 5d for terminals of different types, allowing it to be applied to multiple types of end treatment patterns (herein, patterns in the end treatment depending upon types of the terminals to be crimped to the ends Wa and Wb, presence of terminals, and the like are referred to as end treatment patterns). In the present embodiment, four crimping devices 5a, 5b, 5c, and 5d are provided so as to handle terminals of four types.

Movement of the electric wire W from the measuring portion 2 to the discharge portion 6 is performed by the transfer portion 7. The transfer portion 7 is formed of a plurality of securing side chucks 7a secured to a main body of the electric wire end treatment device 1, a plurality of transfer side chucks 7b which are made possible to transfer with respect to the main body of the electric wire end treatment device 1, and a guide rail 7c for securing the plurality of transfer side chucks 7b. The chucks 7a and 7b are respectively arranged into lines.

Herein, the securing side chucks 7a and the transfer side chucks 7b are to be opened and closed in a horizontal direction in the figure. The securing side chucks 7a are formed of a first securing side chuck 7a1 which opposes the measuring portion 2 and the cutting portion 3, a second securing side chuck 7a2 which opposes the strip portion 4, and third securing side chucks 7a3, 7a3, . . . , which oppose the crimping devices 5a through 5d of the crimping portion 5.

The transfer side chucks 7b are formed of a first transfer side chuck 7b1 which opposes the measuring portion 2 and the cutting portion 3, a second transfer side chuck 7b2 which opposes the strip portion 4, and third transfer side chucks 7b3, 7b3, . . . , which oppose the crimping devices 5a through 5d of the crimping portion 5. As any of the securing side chucks 7a and the transfer side chucks 7b, a commercially available air chuck may be used.

The guide rail 7c is connected to the transferring actuator 8, and can move parallel to the transfer direction C. Thus, the transfer portion 7 can transfer electric wires substantially linearly in the transfer direction C from the electric wire supply side A to the electric wire discharge side B.

Specifically, the transfer portion 7 holds an end Wa and Wb of the electric wire W with a securing side chuck 7a, and then, have a transfer side chuck 7b at a same position in the transfer direction C hold the end Wa and Wb. Then, with the transfer side chuck 7b holding the end Wa and Wb, the securing side chuck 7a releases the end Wa and Wb and the guide rail 7c is moved parallel to the transfer direction C toward the electric wire transfer side B by one step. Then, the end Wa and Wb is held by a securing side chuck 7a at a same position as the transfer side chuck 7b holding the end Wa and Wb in the transfer direction C.

Next, the guide rail 7c is returned to the electric wire supply side A by one step, and the end Wa and Wb held by the securing side chuck 7a is held by a transfer side chuck 7b at a same position in the transfer direction C. Then, a series of operations by the securing side chucks 7a and the transfer side chucks 7b as described above is performed again. By repeating such a series of operations, the electric wires W are fed in series to the electric wire discharge side B through the cutting process and/or crimping process.

Between the crimping portion 5 and the discharge portion 6 for discharging the electric wire transferred by the transfer portion 7 after the crimping process by the crimping portion 5, the temporary holding chuck 9 for temporary receiving and holding the ends Wa and Wb from the transfer side chucks 7b is provided. Between the transfer portion 7 and the discharge portion 6, the discharge device 10 for further receiving the ends Wa and Wb from the temporary chuck 9 and moving them to the discharge portion 6 is provided.

Now, the discharge device 10 is described with reference to FIG. 2. The discharge device 10 is formed of discharge cylinders 10c and 10d which enable a plurality of (two in this example) discharge chucks 10a and 10b to move vertically, and a discharge actuator 10e from which the discharge cylinders 10c and 10d are hung and which enables the discharge chucks 10a and 10b and the discharge cylinders 10c and 10d to move in a horizontal direction so as to move the electric wire W from the front of the temporary chuck 9 to the front of the discharge beam 11 which will be described later. The discharge chucks 10a and 10b are aligned substantially horizontally, and are provided parallel in a direction substantially vertical to the transfer direction C (see direction D indicated by an arrow in the figure). In FIG. 2, the transfer direction C is a direction vertical to the plane of the paper on which FIG. 2 is drawn.

To the calculation device 20, electric wire information, which relates to the content of processing at the process subsequent to the end treatment process for the electric wire W performed in the electric wire end treatment device 1, is previously input, and the calculation device 20 have the memory device 21 stores the information. The calculation device 20 reads out the electric wire processing information from the memory device 21 as necessary, and controls the end treatment portion 1a (the measuring portion 2, the cutting portion 3, the strip portion 4, and the crimping portion 5), the transfer portion 7, the temporary holding chuck 9, the discharge device 10 and the like based on the information.

Herein, the content of processing mentioned above includes types of the electric wires used in processing, the number thereof, the order of the electric wires to be processed, and types of processing (for example, a twisting process, a jointing process, a sub-assy process, and the like).

Now, the discharge beam 11 provided in the discharge portion 6 is described. The discharge beam 11 is a jig which organizes a discharged electric wire into a small size and secures. As shown in FIG. 7, the discharge beam 11 includes a bottom portion 11a and engagement portions 11b. A length of the bottom portion 11a is about 0.1 to 1 m. The bottom portion 11a is a plate-like holding fixture for securing the engagement portions 11b, and is formed of metal, resin, or the like. Holes are provided on an upper surface of the bottom portion 11a with a predetermined substantially equal intervals therebetween.

An engagement portion 11b is formed of a supporting rod 11c, a volt 11d for securing a lower end of the supporting rod 11c, and an engaging body 11e which covers a side portion of the supporting rod 11c. A plurality of engagement portions 11b are provided parallel to each other.

The supporting rod 11c is covered by the engaging body 11e and a threaded hole 11c1 is formed on one end of the supporting rod 11c. The volt 11d is provided inside the bottom portion 11a, and the volt 11d penetrates through the hole of the bottom portion 11a and is screwed to the threaded hold 11c1, thereby threadably mounting one end of the supporting rod 11a onto the bottom portion 11a.

Herein, the engaging body 11e has a tubular shape having a hole for inserting the supporting rod 11c therethrough in the center. A cross-sectional shape of the engaging body 11e may be any shape as long as the electric wires can be easily secured. It can be a shape of star, a rhomboid shape, or the like.

The intervals of the engaging bodies 11e are set such that the electric wires are not damaged and are securely engaged (sandwiched). Specifically, the distances between the engaging bodies 11e on an outer surface are set to be shorter than a diameter of the electric wire. Further, the distances between the supporting rods 11c on an outer surface are set to be longer than a diameter of the electric wire. The engaging bodies 11e are formed of a material which elastically deforms such as an elastic body, resin, rubber, sponge and the like.

The discharge beam 11 forms engagement spaces 11f, 11f, . . . between the engaging portions 11b, 11b, . . . (the engaging bodies 11e, 11e, . . . ) adjacent to each other. With such a structure, the end Wa or Wb of the electric wire W is inserted into the engagement space 11f between the engaging portions 11b and 11b adjacent to each other and the end Wa or Wb is sandwiched by the engagement bodies 11e and 11e, thereby enabling the end Wa or Wb to be engaged at a predetermined position.

In the discharge portion 6, the discharge beam 11 is provided such that the parallel direction of the engaging portions 11b and the transfer direction C of the electric wire W by the transfer portion 7 are substantially identical directions.

Now, operations of the electric wire end treatment device 1 according to the present embodiment are described.

Under operation control of the calculation device 20, the electric wire end treatment device 1 supplies the electric wire W along a predetermined path, which passes through the measuring portion 2 and the cutting portion 3 as indicated by a solid line in FIG. 1, by an electric wire supply device which is not shown in the figure. The direction of the discharge side end Wb of the electric wire W is reversed by 180 degrees as indicated by a solid line in FIG. 1 by a reversing device which is not shown in the figure, and the electric wire W is provided to the strip portion 4. At this time, with a portion near the discharge side end Wb being held by the second securing side chuck 7a2 opposing the strip portion 4, a part of the coating of the discharge side end Wb is removed at the strip portion 4.

When the electric wire W is supplied by the electric wire supply device, the total length of the electric wire W is measured by the measuring portion 2 as it passes through the measuring portion 2, and is fed until it has a desired length. Then, the supply side end Wa is held by the first securing side chuck 7a1 opposing the cutting portion 3, and the supply side end Wa is cut by a cutter or the like at the cutting portion 3.

In the present embodiment, as the measuring portion 2 and the cutting portion 3 are controlled by the calculation device 20, an end treatment depending upon each of the electric wires W can be performed such as setting lengths for each of the electric wires W based on the electric wire processing information stored in the memory device 21.

Next, the electric wire W is transferred in the direction of the transfer direction C by the transfer portion 7 by one step. Specifically, portions of the supply side end Wa and the discharge side end Wb of the electric wire W, which are held by the first securing side chuck 7a1 and the second securing side chuck 7a2, are held by the first transfer side chuck 7b1 and the second transfer side chuck 7b2, which are respectively at same positions in the transfer direction C. Then, the first securing side chucks 7a1 and 7a2 release holding, and the transferring actuator 8 drives the guide rail 7c to move parallel to the transfer direction C toward the electric discharge side B by one step.

Specifically, in the electric wire end treatment device 1, as the guide rail 7c moves, all the transfer side chucks 7b (7b1 through 7b3) move toward the electric discharge side B by one step. In this way, as shown in FIG. 1 by two dotted chain line as an electric wire W', a discharge side end Wb' moves by one step and reaches the crimping portion 5. At the same time, a supply side end Wa' moves by one step and reaches the strip portion 4.

Next, the supply side end Wa and the discharge side end Wb of the electric wire W are held by the second securing side chuck 7a2 and the third securing side chuck 7a3, and then, the first and the second transfer side chucks 7b1 and 7b2 release holding. Next, a terminal is crimped to the discharge side end Wb at the crimping portion 5 by a terminal crimping machine (applicator) not shown in the figure. Also, a part of the coating of the supply side end Wa is removed at the strip portion 4.

Then, the guide rail 7c is returned toward the electric wire supply side A by one step, and the discharge side end Wb held by the third securing side chuck 7a3 is now held by the third transfer side chuck 7b3 at the same position as the third securing side chuck 7a3 in the transfer direction C. At the same time, the supply side end Wa held by the second securing side chuck 7a2 is now held by the second transfer side chuck 7b2 at the same position as the second securing side chuck 7a2 in the transfer direction C. Then, the second and third securing side chucks 7a2 and 7a3 release holding the ends Wa and Wb.

Next, with the second transfer side chucks 7b2 and 7b3 holding the ends Wa and Wb, the guide rail 7c is moved parallel to the transfer direction C toward the electric wire discharge side B by one step. In this way, the ends Wa and Wb move by one step.

Then, the supply side end Wa is held by the third securing side chuck 7a3, and at the same time, the discharge side end Wb is held by the third securing side chuck 7a3 at the same position as the third transfer side chuck 7b3 in the transfer direction C. The second and the third transfer side chucks 7b2 and 7b3 release holding. Then, a terminal is crimped to the supply side end Wa at the crimping portion 5 by the terminal crimping machine (applicator).

In this way, a series of operations such as holding the ends Wa and Wb by the securing side chuck 7a, holding the ends Wa and Wb by the transfer side chuck 7b, releasing the held ends Wa and Wb by the securing side chuck 7a, moving the guide rail 7c, holding the ends Wa and Wb by the securing side chuck 7a, releasing the held the ends Wa and Wb by the transfer side chuck 7b, returning the guide rail 7c, holding the ends Wa and Wb by the transfer chuck 7b, releasing the held ends Wa and Wb by the securing side chuck 7a, moving the guide rail 7c, . . . and so on are repeated for performing a desired end treatment.

The above-described crimping portion 5 includes a plurality of crimping device 5a, 5b, 5c, and 5d. This is because a terminal to be crimped may differ as end treatment patterns are set depending upon types of the electric wires W. For example, as shown in FIG. 3, the calculation device 20 controls the components such that crimping is started when the supply side end Wa and the discharge side end Wb reach the predetermined crimping devices 5a through 5d based on the electric wire processing information previously stored in the memory device 21.

Next, the electric wire W, which is subjected to the crimping treatment as shown in FIG. 3, is discharged to the discharge portion 6. Specifically, the third transfer side chuck 7b3 holds a portion of the discharge side end Wb of the electric wire W which is held by the third securing chuck 7a3, and then, the third securing side chuck 7a3 releases holding. Next, as shown in FIG. 4, the guide rail 7c is moved in the transfer direction C toward the electric discharge side B by one step, and the temporary holding chuck 9, which is provided between the crimping portion 5 and the discharge portion 6, receives the discharge side end Wb from the third transfer side chuck 7b3 to hold. Then, the discharge device 10 receives and holds the discharge side end Wb and the temporary holding chuck 9 releases the discharge side end Wb.

Further, with the supply side end Wa of the electric wire W being held by the third securing side chuck 7a3, the guide rail 7c returns toward the electric wire supply side A by one step from the state as shown in FIG. 4. Then, the third transfer side chuck 7b3 at the same position as the third securing side chuck 7a3 which is currently holding the supply side end Wa in the transfer direction C receives the supply side end Wa from the third securing side chuck 7a3 to hold.

Next, as shown in FIG. 5, since the guide rail 7c moves toward the electric wire discharge side B, the third transfer side chuck 7b3 moves toward the electric wire discharge side B by one step. After the temporary holding chuck 9 receives the supply side end Wa from the third transfer side chuck 7b3 and holds, the discharge device 10 similarly receives and hold the supply side end Wa, and then, the temporary holding chuck 9 releases the supply side end Wa. Accordingly, the discharge device 10 holds the supply side end Wa and the discharge side end Wb. Then, the guide rail 7c returns toward the electric wire supply side A by one step.

Finally, the discharge device 10 moves from a position opposing the temporary holding chuck 9 to a neighborhood of the discharge beam 11 provided in the discharge portion 6 as shown in FIG. 6 by the discharging actuator 10e (see FIG. 2). Then, as will be described later, the electric wire W is secured to the discharge beam 11 by the discharge device 10, and the electric wire W is released to discharge the electric wire W to the discharge portion 6 and to complete the end treatment process for the electric wire W.

Operations of the discharge device 10 controlled by the calculation device 20 are described in details. When the discharge side end Wb which is transferred by the transfer portion 7 is held by the temporary holding chuck 9, the discharge cylinder 10c descends and the discharge chuck 10a holds the discharge side end Wb as shown in FIG. 2(a). Then, as shown in FIG. 2(b), with the discharge chuck 10a holding the discharge side end Wb, the discharge cylinder 10c ascends.

Next, when the supply side end Wa which is transferred by the transfer portion 7 is held by the temporary holding chuck 9, the discharge cylinder 10d descends and the discharge chuck 10b holds the supply side end Wa and the discharge side end Wb as shown in FIG. 2(c). Then, as shown in FIG. 2(d), with the discharge chuck 10b holding the supply side end Wa and the discharge side end Wb, the discharge cylinder 10d ascends. When the discharge cylinder 10d finishes ascending, the discharge chuck 10a holds the supply side end Wa and the discharge side end Wb.

Further, the discharge chucks 10a and 10b and the discharge cylinders 10c and 10d are moved to positions above the discharge beam 11 by the discharge actuator 10e, and the discharge cylinders 10c and 10d are descended to insert the ends Wa and Wb into a desired engagement space 11f of the discharge beam 11 (see FIG. 7). In this way, the supply side end Wa and the discharge side end Wb are secured to desired positions on the discharge beam 11. After the securing process, the discharge chucks 10a and 10b release the supply side end Wa and the discharge side end Wb, thereby completing the discharge process.

The supply side end Wa and the discharge side end Wb are inserted into the engagement space 11f between the engagement portions 11b adjacent to each other on the discharge beam 11, and are sandwiched (engaged) with two engaging bodies 11e and 11e. In this way, the electric wire W is secured to the discharge beam 11 in a folded state. At this time, both the supply side end Wa and the discharge side end Wb may be secured to the same position in a parallel direction of the engaging portion 11b, i.e., may be overlapped and secured in one engagement space 11f as shown in FIG. 7(a). Alternatively, as shown in FIG. 8, one of the ends, i.e., the supply side end Wa, and the other of the ends, i.e., the discharge side end Wb, may be secured at different positions, i.e., in different engagement spaces 11f. A method for securing the electric wire W is not limited to such examples, and may be set freely by moving the discharge device 10 to a desired position.

As shown in FIGS. 7 and 8, a plurality of electric wires W are aligned in the parallel direction of the engaging portions 11b and secured to the discharge beam 11. However, the arrangement pattern when the electric wires W are secured to the discharge beam 11 (herein, an alignment pattern in the parallel direction of the engaging portion 11b of the discharge beam 11) are set by the calculation device 20 based on the electric wire processing information, i.e., the content of processing at the process subsequent to the end treatment process.

Specifically, the calculation device 20 reads out the electric wire processing information relates to the content of processing from the memory device 21, and controls the discharge device 10 based on the electric wire processing information. In this way, the securing process for securing the electric wires W to the discharge beam 11 in the discharge portion 6 is controlled, and a plurality of the electric wires W are secured in accordance with previously set alignment pattern.

Figure 19:
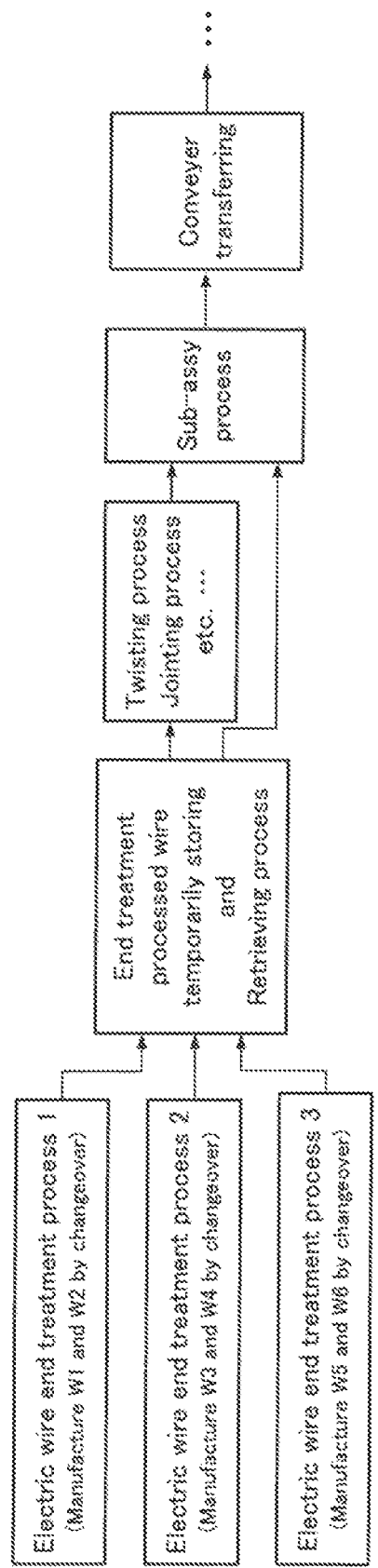
[FIG. 19] An illustrative diagram for illustrating a conventional manufacturing process for wire harnesses.

A series of operations as described above is repeated for performing the end treatment for a plurality of electric wires. A wire harness is manufactured by moving such wires to the subsequent process shown in FIG. 9. Specifically, as shown in FIG. 9, the end treatment process for the electric wires W is followed by a twisting process, a jointing process, a sub-assy process, and the like. The processing types such as twisting process, a jointing process, a sub-assy process, and the like shown in FIG. 9 are similar to those in FIG. 19 which shows a conventional manufacturing process, and the detailed descriptions are omitted.

Herein, in the discharge portion 6 of the electric wire end treatment device 1, for example, a set of electric wires W which will be necessary in the subsequent process in manufacturing a wire harness are aligned from the right or left of the discharge beam 11 in an order to be used in the subsequent process. In this way, the wires can be aligned in a way which allows a worker to readily perform operations without hesitating.

For supplying electric wires W to a twisting process as a subsequent process, multiple sets of electric wires W may be aligned from the right or left of the discharge beam 11 repeatedly in units of the number of the wires to be twisted at a time. For supplying electric wires W to a jointing process as a subsequent process, multiple sets of electric wires W may be aligned from the right or left of the discharge beam 11 repeatedly in units of the number of the wires to be jointed at a time.

In this way, in the present embodiment, the electric wires W are secured to the discharge beam 11 in the alignment pattern which is set based on the content of processing the electric wires W at the process subsequent to the end treatment process, thereby enabling the electric wires W required in the next process to be discharged in an organized state, and to be immediately moved from the discharge portion 6 to the next process to proceed operations.

This allows omitting a space for temporarily storing electric wires W which have been subjected to end treatment, and also an operation to select and retrieve wires which will be required at a subsequent process from the space. Accordingly, a space in a manufacturing place for wire harnesses can be reduced, and a lead time between the end treatment process and the subsequent process can be shortened.

Since only the wires required for the subsequent process are secured to the discharge beam 11, it is no longer necessary to previously manufacture multiple types of electric wires W. Therefore, a disadvantage of a lot of middle stock is eliminated, and it becomes possible to readily handle a multiple-type, small-lot production.

Furthermore, since the electric wires W are aligned in the parallel direction of the engagement portion 11b, a worker can readily understand an operational procedure in the subsequent process by confirming the alignment order of the electric wires W, thereby ensuring suppressing erroneous assembling in the subsequent process.

Further, since the alignment direction of electric wires W in the discharge beam 11 is substantially identical to the transfer direction C by the transfer portion 7, means for changing directions is not necessary between the transfer portion 7 and the discharge portion 6. In this way, the electric wire end treatment device 1 can be prevented from being complicated.

Further, since the discharge chucks 10a and 10b are lined substantially horizontally, and are provided parallel in a direction substantially vertical to the transfer direction C, the size of the electric wire end treatment device 1 can be readily reduced.

Figure 10:
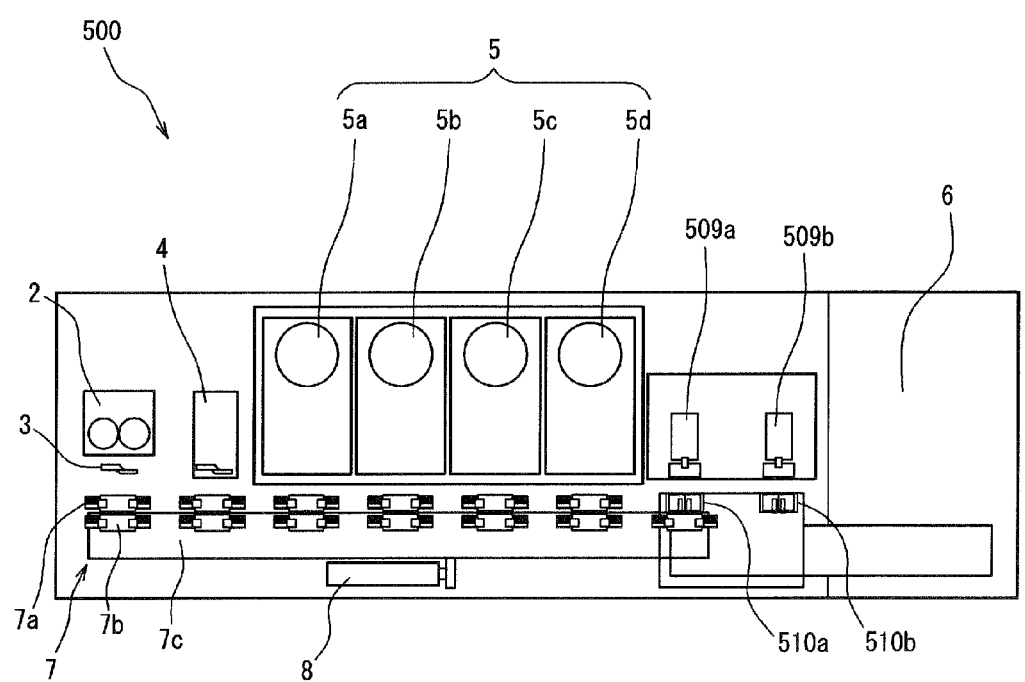
[FIG. 10] A plan view of a conventional electric wire end treatment device.

Specifically, in a conventional electric wire end treatment device 500 shown in FIG. 10, temporary holding chucks 509a and 509b temporarily receive ends of an electric wire from a securing side chuck 7a and a transfer side chuck 7b. Further, discharge chucks 510a and 510b receive the ends of the electric wire from temporary holding chucks 509a and 509b and move them to a discharge portion 6. Therefore, an interval between the temporary holding chucks 509a and 509b and an interval between the discharge chucks 510a and 510b have to match an interval between the securing side chucks 7a or an interval between the transfer side chucks 7b. Thus, it was difficult to reduce the size of the conventional electric wire end treatment device 500.

However, in the electric wire end treatment device 1 according to the present embodiment, as described above, the discharge chucks 10a and 10b are lined substantially horizontally, and are provided parallel in a direction substantially vertical to the transfer direction C. With such a structure, the size of the electric wire end treatment device 1 can be reduced, particularly in the transfer direction C.

Further, as shown in FIG. 7, since the above-described discharge device 10 secure the ends Wa and Wb at positions overlapping each other in the parallel direction of the engaging portions 11b, the number of the engaging portions 11b can be reduced, and as a result, a length of the discharge beam 11 in the parallel direction of the engaging portions 11b can be reduced. Therefore, the discharge portion 6 in which the discharge beam 11 is provided can be miniaturized, and the size of the electric wire end treatment device 1 can be further reduced.

Furthermore, in the present embodiment, the memory device 21 which records the electric wire processing information is provided, and the calculation device 20 sets the alignment pattern and also controls the end treatment portion 1a, the transfer portion 7, and the like based on the electric wire processing information. Since the components are controlled commonly by the calculation device 20, the treatments in the electric wire end treatment device 1 can be performed in association with each other. Thus, the electric wire end treatment device 1 can be operated automatically and efficiently.

Further, since the calculation device 20 controls the end treatment for each of the electric wires W in the end treatment portion 1a based on the electric wire processing information, it becomes possible to readily generate the electric wires W of various specifications by control, for example, by varying lengths of the electric wires W cut at the cutting portion 3 for each of the electric wires W based on the electric wire processing information.

Further, the end treatment portion 1a includes the crimping devices 5a, 5b, 5c and 5d as treatment means for performing treatments for the electric wires W depending upon the end treatment patterns, and the calculation device 20 controls the crimping devices 5a, 5b, 5c and 5d based on the electric wire processing information. With such a structure, the ends Wa and Wb of the electric wires W can be treated in various end treatment patterns by appropriately changing types of terminals to be crimped, presence of a terminal, and so on based on the electric wire processing information, for example.

Hereinafter, another embodiment of the electric wire end treatment device and the electric wire end treatment method according to the present invention will be described in details with reference to FIGS. 11 through 16. In FIGS. 11 through 16, components similar to those in the first embodiment shown in FIGS. 1 through 9 are denoted by the same reference numerals and the descriptions thereof are omitted.

Figure 11:
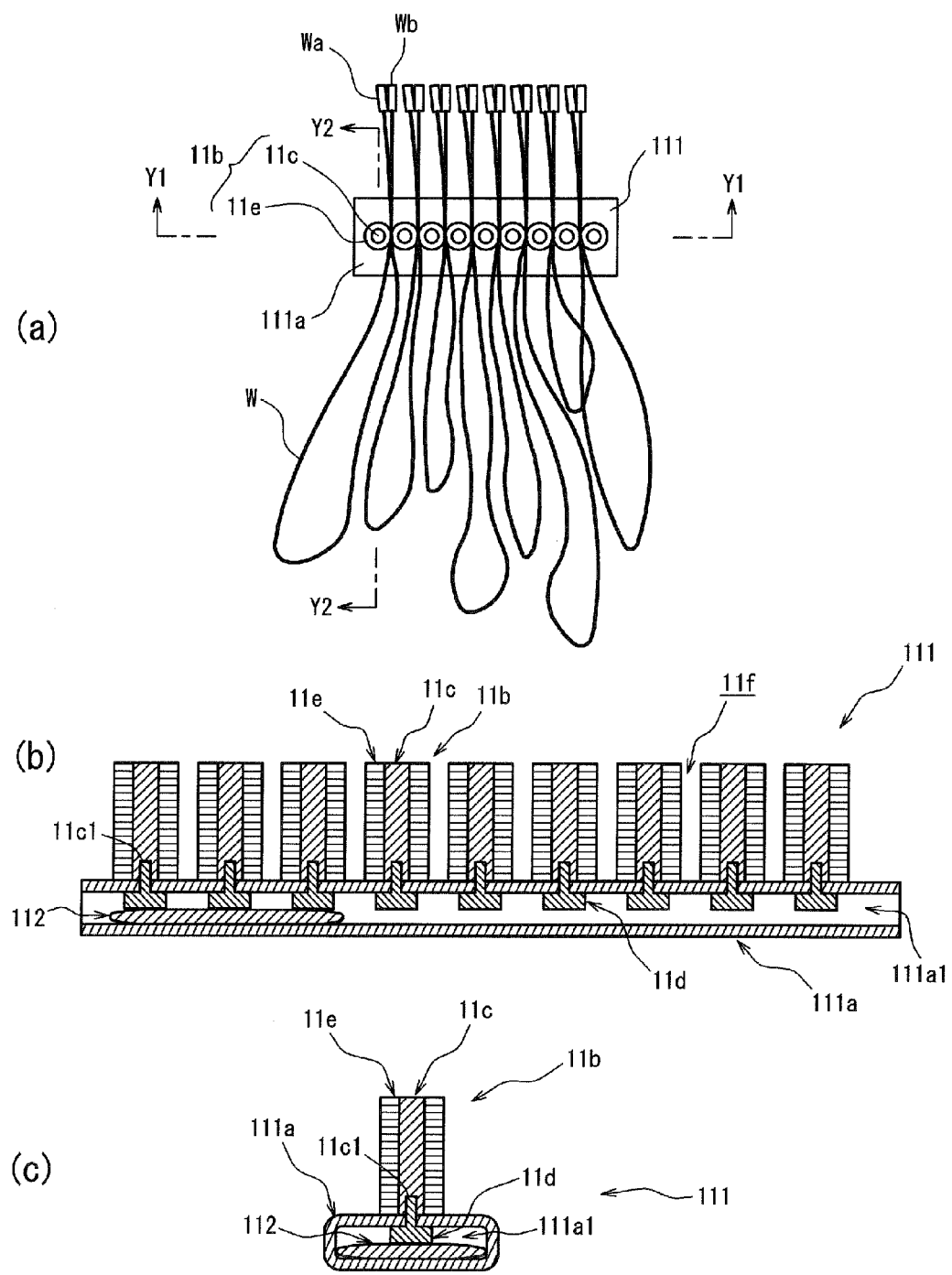
[FIG. 11] Diagrams showing a discharge beam in an electric wire end treatment device according to another embodiment of the present invention and a state of securing electric wires thereto.
Figure 12:
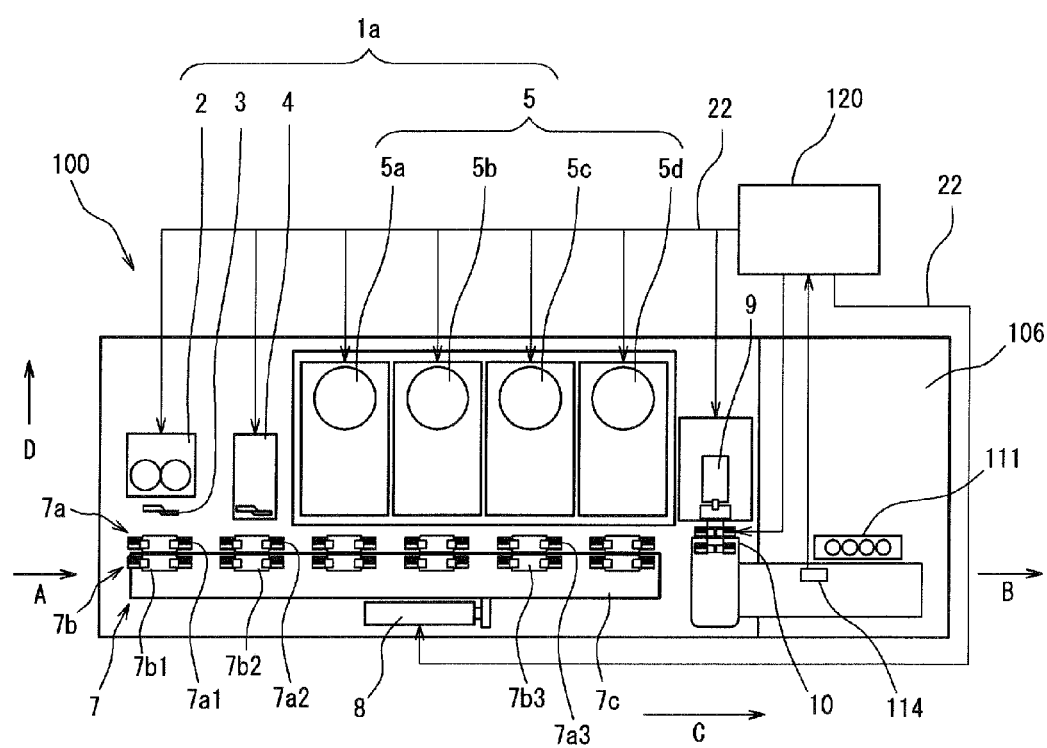
[FIG. 12] A plan view of the electric wire end treatment device.
Figure 13:
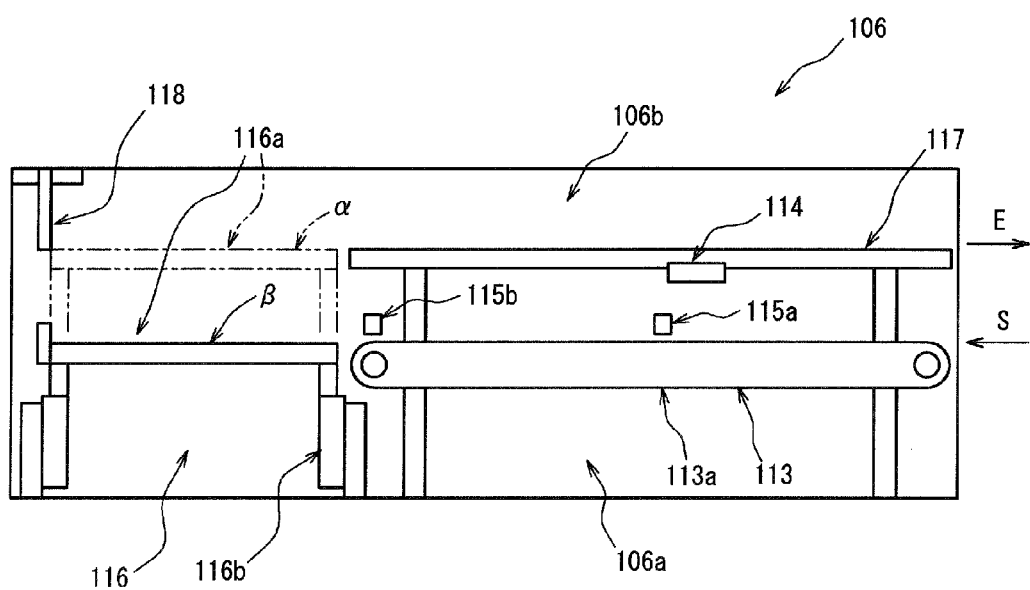
[FIG. 13] A front view of a discharge beam supply discharge portion.
Figure 14:
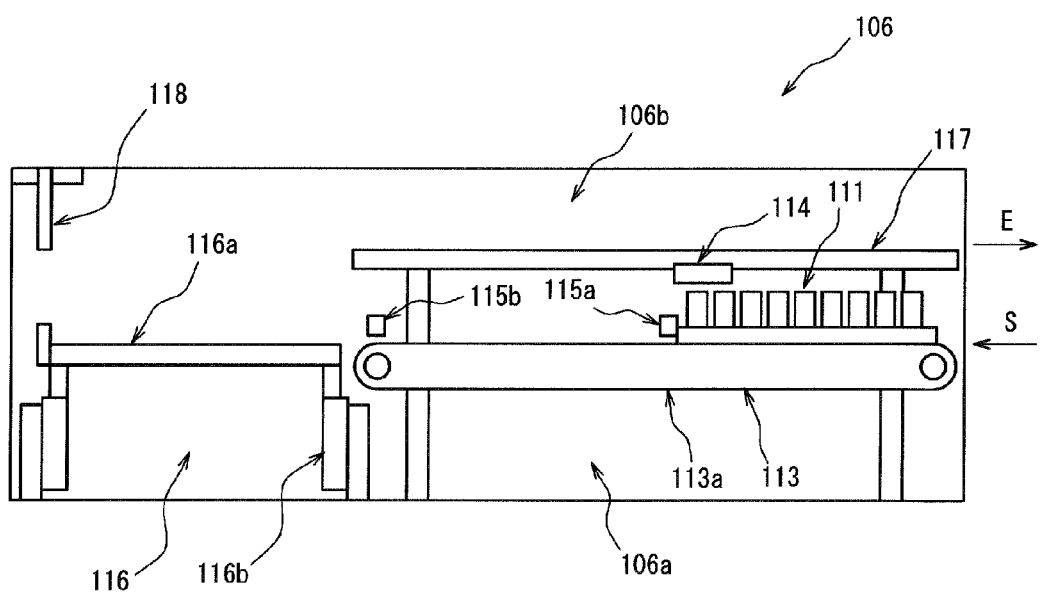
[FIG. 14] A front view of the discharge portion showing a discharge beam being inserted into a discharge beam supply portion.
Figure 15:
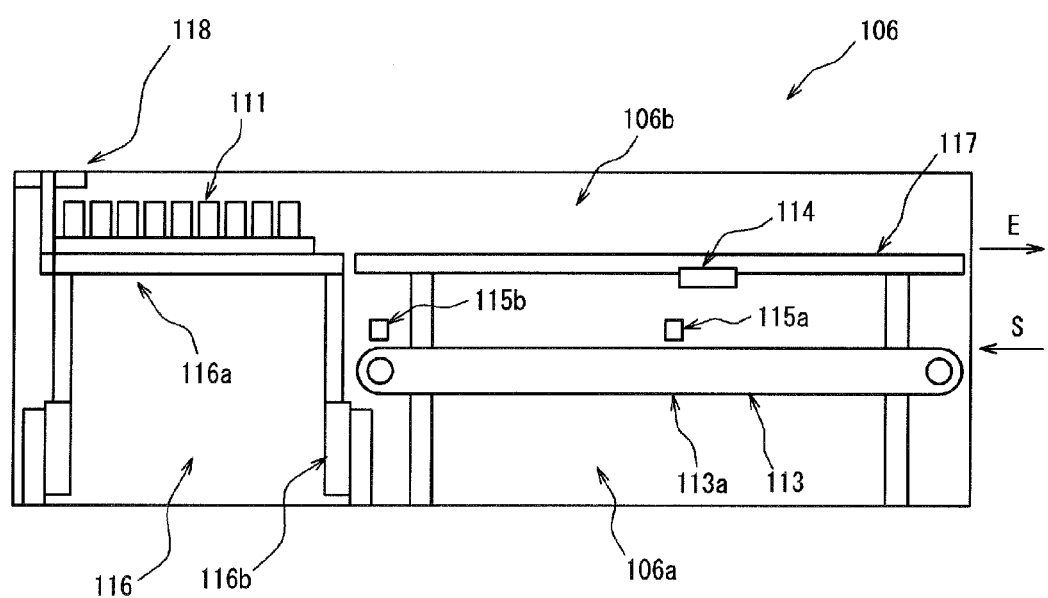
[FIG. 15] A front view of the discharge portion showing the discharge beam being elevated to a discharge beam discharge portion.
Figure 16:
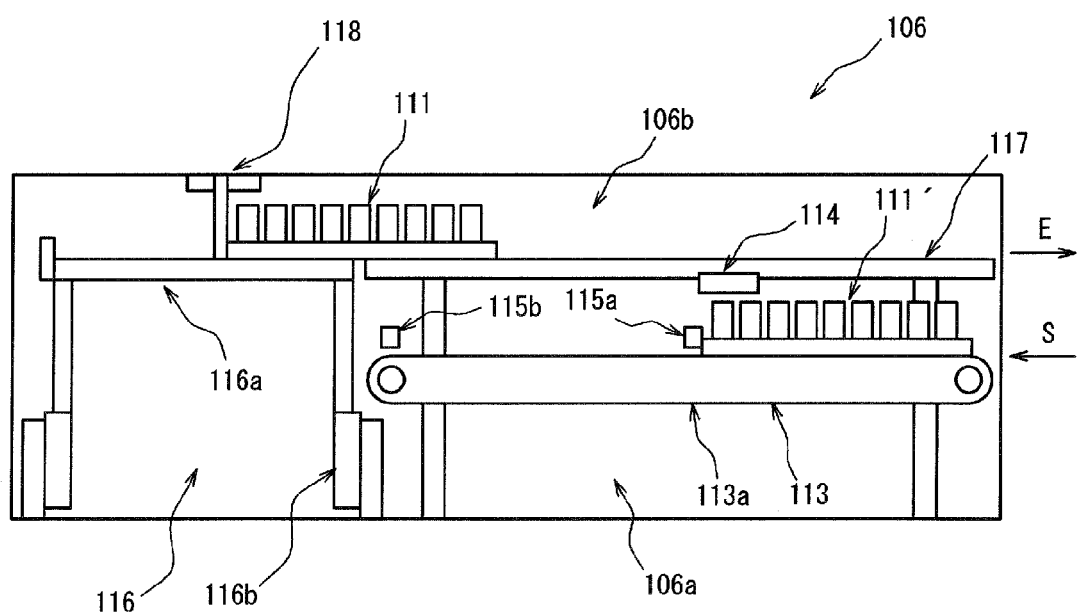
[FIG. 16] A front view of the discharge portion showing one of discharge beams being moved to a predetermined position of the discharge beam discharge portion with a transfer claw.

FIGS. 11(*a*) through 11(*c*) are diagrams showing a discharge beam 111 in an electric wire end treatment device 100 according to another embodiment of the present invention, and a state of an electric wire W secured thereto. FIG. 11(*a*) is a plan view, FIG. 11(*b*) is a cross-sectional view along Y1-Y1, and FIG. 11(*c*) is a cross-sectional view along Y2-Y2. FIG. 12 is a plan view of the electric wire end treatment device 100. FIG. 13 is a front view of a discharge portion 106. FIG. 14 is a front view of the discharge portion 106 with the discharge beam 111 being inserted into a discharge beam supply portion 106*a*. FIG. 15 is a front view of the discharge portion 106 with the discharge beam 111 being ascended to a discharge beam discharge portion 106*b*. FIG. 16 is a front view of the discharge portion 106 with one of the discharge beams 111 being moved to a predetermined position of the discharge beam discharge portion 106*b* by a transfer claw 118.

The electric wire end treatment device 100 includes an IC tag 112 which records electric wire processing information relates to a content of processing at a process subsequent to the end treatment process (see FIG. 11(*b*)), an IC reader 114 which reads out the electric wire processing information from the IC tag 112, and a calculation device 120 which controls a securing process for securing an electric wire W to the discharge beam 111 in the discharge portion 106 based on the electric wire processing information read out by the IC reader 114 with the IC tag 112 being secured to the discharge beam 111.

As shown in FIGS. 11(*b*) and 11(*c*), the discharge beam 111 according to the present embodiment is formed of a hollow bottom portion 111*a* having a cavity portion 111*a*1 inside, and a plurality of engaging portions 11*b* secured parallel to the bottom portion 111*a*.

The IC tag 112 is secured to the cavity portion 111*a*1, and the IC tag 112 records the electric wire processing information similar to that stored in the memory device 21 in the first embodiment shown in FIGS. 1 through 9. A material of the bottom portion 111*a* is not a metal, and is formed of a material which does not inhibit communication of the IC tag 112. Preferably, a light material such as a resin, plastic or the like is desirable. Furthermore, a transparent material is more desirable for the bottom portion 111*a* such that the IC tag 112 can be seen.

Further, the calculation device 120 shown in FIG. 12 receives the electric wire processing information from the IC reader 114 of the discharge portion 106, and controls a measuring portion 2, a cutting portion 3, a strip portion 4, a crimping portion 5, the discharge portion 106, a transfer portion 7, a temporary holding chuck 9, a discharge device 10 and the like based on the information.

In the present embodiment, the calculation device 120 controls the discharge device 10 based on the electric wire processing information recorded on the IC tag 112, and secures a plurality of electric wires W in accordance with the previously set alignment pattern.

The discharge portion 106 according to the present embodiment is described with reference to FIG. 13. The discharge portion 106 is formed of the discharge beam supply portion 106*a* on a lower stage, and the discharge beam discharge portion 106*b* on an upper stage.

The discharge supply beam 106*a* includes a belt conveyor 113, the IC reader 114, stoppers 115*a* and 115*b*, and a lifter portion 116.

The IC reader 114 is provided above the belt conveyor 113. The belt conveyor 113 has a belt 113*a* fed toward the lifter portion 116 (from the right to left in FIG. 13). The stoppers 115*a* and 115*b* are provided independently from the belt 113*a*. Thus, even when the belt 113*a* is being fed, the position of the discharge beam 111 can be maintained. The lifter portion 116 is formed of a lifter table 116*a* and a lifter 116*b*, and is formed so as to be able to move horizontally between an upper stage position α indicated by a two-dotted chain line in FIG. 13 and a lower stage position β indicated by a solid line. With the lifter table 116*a* and the lifter 116*b*, the discharge beam 111 can be lifted from the discharge beam supply portion 106*a* to the discharge beam discharge portion 106*b*.

The discharge beam discharge portion 106*b* has a discharge beam discharge table 117 positioned above the belt conveyor 113. The transfer claw 118 for moving the discharge beam 111 can be moved parallel to a discharge direction E by moving means, which is not shown, such as belt. As necessary, a metal shield plate is provided between the IC reader 114 and the discharge beam discharge table 117 in order to prevent data from being erroneously read out.

A treatment at the discharge portion 106 according to the present embodiment is described with reference to FIGS. 14 through 16. The treatment at the discharge portion 106 is controlled by the calculation device 120, and the calculation device 120 controls the operations of the components (the measuring portion 2, the cutting portion 3, the strip portion 4, the crimping portion 5, the discharge portion 106, the transfer portion 7 (the transferring actuator 8), the temporary holding chuck 9, the discharge device 10, and the like).

In the discharge portion 106, first, a worker or the like inserts the discharge beam 111 to the discharge beam supply portion 106*a* in a discharge beam supply direction S, and the discharge beam 111 is provided on the belt conveyor 113 as shown in FIG. 14. At this point, the electric wire W is not secured to discharge beam 111. Next, the discharge beam 111 is moved in a direction of the discharge beam supply direction S by the belt 113*a*, and then, is stopped by the stopper 115*a* (see FIG. 14). In such a state, the IC reader 114 reads out the electric wire processing information recorded on the IC tag 112 of the discharge beam 111.

Based on the read out electric wire processing information, the calculation device 120 controls the components of the electric wire end treatment device 100 (the measuring portion 2, the cutting portion 3, the strip portion 4, the crimping portion 5, the discharge portion 106, the transfer portion 7 (the transferring actuator 8), the temporary holding chuck 9, the discharge device 10, and the like). This allows the electric wire end treatment device 100 to automatically start a series of end treatments such as measuring, cutting, stripping, and crimping a terminal for electric wires. The electric wire W subjected to end treatment is inserted into an engagement space 11*f* between the engaging portions 11*b* and 11*b* of the discharge beam 111 and engaged thereto by the discharge device 10.

Then, the stopper 115*a* is released, and the discharge beam 111 is moved toward the lifter portion 116 by the belt conveyor 113. At this time, if the lifter table 116*a* is positioned at the upper stage position α, the discharge beam 111 is stopped in front of the lifter table 116a by the stopper 115b.

If the lifter table 116a finishes descending, and is positioned at the lower stage position β, the stopper 115b is released. The discharge beam 111 is moved toward the lifter table 116a by the belt conveyor 113, and is placed on the lifter table 116a.

Next, as shown in FIG. 15, the lifter table 116a ascends to the upper stage by the lifter 116b. The lifter 116b is driven by a motor or the like.

As shown in FIG. 16, when the lifter table 116a ascends to the upper stage, the transfer claw 118 moves the discharge beam 111 to a predetermined position. At this time, the electric wire W, which is transferred by the transfer portion 7 and reaches the discharge portion 106 by the discharge device 10, is inserted into a desired position in the engagement space 11f and is engaged between the engaging portions 11b and 11b. A plurality of electric wires W are engaged between the engaging portions 11b, and the securing treatment for the electric wires W to the discharge beam 111 is completed.

When all the electric wires W have been secured by the engaging portions 11b, the transfer claw 118 is moved toward the discharge beam discharge direction E to complete the discharge treatment. Then, a worker retrieves the discharge beam 111, and moves to the subsequent process.

As shown in FIG. 16, even when the securing treatment for electric wires W is being performed, another discharge beam 111' may be inserted into the discharge beam supply portion 106a. This allows improving efficiency of operations.

By repeating such operations, a worker can automatically secure a desired electric wire W to the discharge beam 111 based on the electric wire processing information only by injecting the discharge beam 111 into the discharge beam supply portion 106a. Therefore, in manufacturing wire harnesses, erroneous assembling of the electric wires W can be reduced significantly.

Conventionally, in the electric wire end treatment device, for performing end treatments with predetermined conditions, after changeover of a supply portion for electric wires, terminals and the like and a crimping portion, for controlling the components, a worker has to confirm instructions and to manually entry processing conditions in the instructions or simplified data which can discriminate processing conditions to the calculation device. During that time, the device stops, causing the device to operate intermittently, and an operation rate thereof reduces. Therefore, it was not suitable for a wide-variety, small-lot production.

On the other hand, in the electric wire end treatment device 100 according to the present embodiment, the IC tag 112 is secured to the discharge beam 111. Thus, even when the content of processing at the subsequent process changes, it is no longer necessary to perform data entry operation for stage-switching operation every time.

Specifically, in the electric wire end treatment device 100, by injecting the discharge beam 111, on which the IC tag 112 which has the electric wire processing information based on a form of a wire harness to be manufactured is provided, into the discharge beam supply portion 106a, the calculation device 120 automatically discriminates it and perform the stage-switching operation. In this way, the operations at the end treatment process can be automated, and the wide-variety, small-lot production which requires a number of times of stage-switching operations can be performed efficiently.

A form of the electric wire processing information is not limited to the IC tag 112, but may be a barcode, a quick response (QR) code, or the like as long as it utilizes radio waves to communicate wirelessly. Also, it can be either a contact or non-contact type, as long as the electric wire processing information can be distinguished.

In the present embodiment, the IC reader 114 is included in the electric wire end treatment device 100 as a reading portion for reading out the electric wire processing information previously recorded on the IC tag 112. Further, a writing portion for writing a predetermined information into the IC tag 112 may be further included. In such a case, for example, information relates to an end treatment result (processed date and time or the like) may be written, allowing quality control of the electric wires W using the IC tag 112.

Figure 17:
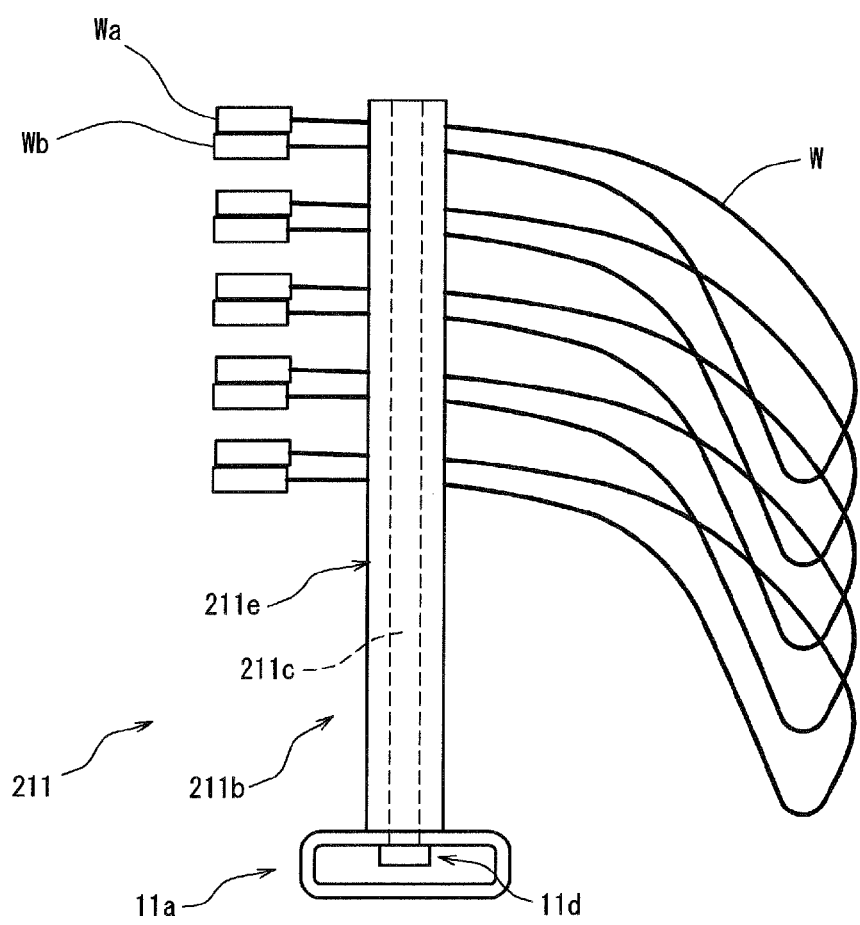
[FIG. 17] Diagrams showing a discharge beam in an electric wire end treatment device according to yet another embodiment of the present invention and a state of securing electric wires thereto.

In the above-described embodiments, when the electric wires W are secured to the discharge beam 11 or 111, they are aligned in the parallel direction of the engaging portions 11b. However, the present invention is not limited to such examples. For example, as a discharge beam 211 shown in FIG. 17, a supporting rod 211c and an engagement body 211e elongated in a vertical direction may be provided in the engaging portion 211b, and a plurality of the electric wires W may be aligned in a longitudinal direction, i.e., the vertical direction, and secured.

In such a case, the arrangement pattern of the electric wires W in the discharge beam 211 is the alignment pattern of the electric wires W in the longitudinal direction (vertical direction). For example, a set of the electric wires W to be required in the subsequent process in manufacturing a wire harness may be aligned from an upper end of the discharge beam 211 in the order to be used in the subsequent process.

In the above-described crimping portion 5, a terminal may be connected to an electric wire end with a method other than the crimping. For example, pressure welding may be used for connecting.

The ends Wa and Wb of the electric wires W are cut at the same positions at the cutting portion 3. Thus, the positions where the terminals are crimped to the ends Wa and Wb at the crimping portion 5 have to be lined parallel to the transfer direction C of the electric wire end treatment device 1 or 100. On the other hand, in many cases, the positions where crimping is performed vary depending upon the differences in the treatment patterns in the crimping devices 5a through 5d.

Therefore, a crimping position adjustment portion may be provided between the strip portion 4 and the crimping portion 5, and a crimping position adjusting securing side chuck which can move in a direction vertical to the transfer direction C may be included in the crimping position adjustment portion. For example, before the crimping treatment at the crimping device 5, the calculation device 20 or 120 previously controls the crimping position adjustment portion and the ends Wa and Wb are provided at optimal crimping positions in accordance with the treatment patterns. In this way, crimping can be performed appropriately without position adjustment for the crimping portion 5.

As in the above-described embodiments, for securing the electric wires W to the discharge beam 11, 111, or 211 (hereinafter, referred to as the discharge beam. 11 or the like), the electric wires W are subjected to end treatment in accordance with the order to be used in the subsequent process, and the electric wires W are aligned sequentially from the one which has been subjected to the end treatment in accordance with the alignment pattern. However, the present invention is not limited to such an example. For example, the end treatment for the electric wires W may be performed in an arbitrary order, and the electric wires W may be re-aligned in accordance with the alignment pattern by predetermined re-alignment means while the electric wires W are being transferred by the transfer portion 7 or being secured to the discharge beam 11 or the like.

In the above-described embodiments, a set of the electric wires W to be required in the process subsequent to the end treatment process are aligned from the right end or left end of the discharge beam 11 or the like (the upper end of the discharge beam 211) in the order to be used in the subsequent process. However, aligning the electric wires W from an end portion of the discharge beam 11 or the like is not necessarily required in the present invention as long as a set of the electric wires W can be moved to the subsequent process with the aligned state (the order of alignment can be arbitrary) being maintained.

Further, in the electric wire end treatment device 1 or 100, an electric wire selecting portion, which will be described later, is provided, thereby enabling treatments for various types of electric wires W having different diameters, colors of insulating coatings, and the like. By appropriately combining lengths of the electric wires W cut at the cutting portion 3, and/or end treatment patterns for the ends Wa and Wb, the electric wires W having various specifications can be generated.

In such a case, a plurality of electric wires W of different types are supplied from the electric wire supply device, and the electric wire selecting portion selects the one(s) to be subjected to the end treatment from the plurality of the electric wires W to supply to the measuring portion 2.

As the electric wire selecting portion, the one including, for example, a plurality of holding mechanisms for individually holding the electric wires W supplied from the electric wire supply device, an endless belt for maintaining the holding mechanisms with predetermined intervals therebetween, and driving means such as a motor for rotary driving the endless belt, is used. In the electric wire selecting portion, a position of the endless belt is set such that one of the holding mechanisms can be provided alternatively in a movement path for the electric wires W to the measuring portion 2.

Herein, for supplying the electric wire W to the measuring portion 2, first, the endless belt is rotary-driven by the driving means, and then, the holding mechanism holding the electric wire W to be subjected to the end treatment is provided on the movement path. At this time, the electric wire W is provided along the movement path, and the electric wire W can be supplied to the measuring portion 2 as shown in FIG. 1 by having the holding mechanism release the electric wire W.

With the above-described electric wire selecting portion, the measuring portion 2, and the plurality of the crimping portions 5, the electric wires W of different types, lengths, and/or end treatment patterns can be generated. However, the present invention is not necessarily limited to such an example. For example, only one crimping portion 5 may be provided, and only the types and lengths of the electric wires W may be made variable while the end treatment pattern is unchanged. Alternatively, the electric wire selecting portion may be omitted, and only the lengths and the end treatment patterns of the electric wires W may be made variable.

For securing the electric wires W to the discharge beam 11, the electric wires W are previously folded by the temporary holding chuck 9 and two discharge chucks 10a and 10b of the discharge device 10 in the above-described embodiments. However, the present invention is not necessarily limited to such an example. For example, only one discharge chuck may be provided in the discharge device 10 and the temporary holding chuck 9 may be omitted. The ends Wa and Wb may be held by the discharge chucks individually and the ends Wa and Wb may be secured to the discharge beam 11 one by one.

Figure 18:
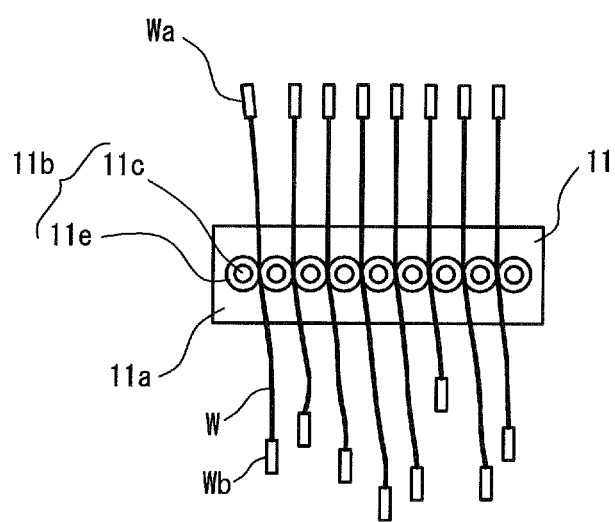
[FIG. 18] A diagram showing yet another state of securing the electric wires to the discharge beam.

For securing the electric wires W, it is not necessary to fold them. For example, as shown in FIG. 18, the electric wire W may be passed through the engagement space 11f, 11f, . . . between the engaging portions 11b, 11b, . . . only once and may be secured in a substantially straight state by holding only one of the ends Wa and Wb with the discharge chuck.

The above-described embodiments use the discharge beam 11 or the like which secures the electric wires W by sandwiching the ends Wa and Wb with the engaging portions 11b, 11b, . . . . However, as long as the alignment state of the electric wires can be maintained, the present invention is not limited to having the above-described discharge beam 11 or the like as securing means. For example, a plate-like base portion with an adhesive member such as a double-faced tape or the like may be used as the securing means, and the electric wires W may be attached to the adhesive member in accordance with a predetermine alignment pattern. In such a case, a magnet may be provided instead of the adhesive member, and the electric wires W may be secured with the magnet.

Regarding correspondence between the structure of the present invention and the above-described embodiments, the end treatment portion of the present invention corresponds to the measuring portion 2, the cutting portion 3, the strip portion 4, and the crimping portion 5. Similarly, the securing means corresponds to the discharge beams 11, 111, 111', and 211, the treatment means corresponds to the crimping devices 5a, 5b, 5c, and 5d, the recording portion corresponds to the IC tag 112, the reading portion corresponds to the IC reader 114, and the calculation portion corresponds to the calculation devices 20 and 120. However, the present invention is not limited to the structures of the above-described embodiments, and many other embodiments can be achieved.

For example, in the above-described embodiments, the electric wires discharged at the discharge portion are carried with a discharge beam manually by a worker to a workplace for the subsequent process. However, the present invention may be applied to an apparatus including a system which automatically transfers the electric wires discharged at the discharge portion with mechanical means such as a belt conveyor, a screw conveyor, and the like.

INDUSTRIAL APPLICABILITY

The present invention can be utilized in manufacturing wire harnesses used for automobiles and the like.

DESCRIPTION OF THE REFERENCE NUMERALS

1 . . . Electric wire end treatment device
1a . . . End treatment portion
2 . . . Measuring portion
3 . . . Cutting portion
4 . . . Strip portion
5 . . . Crimping portion
6 . . . Discharge portion
7 . . . Transfer portion
10 . . . Discharge device
10a, 10b . . . Discharge chuck
11, 111, 111', 211 . . . Discharge beam
11b, 211b . . . Engaging portion
20, 120 . . . Calculation device
112 . . . IC tag
114 . . . IC reader

What is claimed is:
1. An electric wire end treatment device, comprising:
an end treatment portion which treats ends of an electric wire; and
a transfer portion which transfers the electric wire, the electric wire end treatment device, also comprising:

a discharge portion which discharges the electric wire which is subjected to an end treatment by the end treatment portion and transferred by the transfer portion, a recording portion which records electric wire processing information related to content processing of the electric wire at a subsequent process, a reading portion, which reads out the electric wire processing information in communication with the recording portion, securing means for securing the electric wire in a predetermined arrangement pattern which is provided in the discharge portion, and a calculation portion, which controls a securing treatment for securing the electric wire to the securing means in the discharge portion, wherein:

the recording portion is secured to a bottom portion of the securing means, a plurality of engaging portions for engaging end portions of the electric wire aligned in a parallel direction are secured to the bottom portion and arranged in a parallel direction in the securing means and the bottom portion is formed of a material which does not inhibit communication of the recording portion, based on the electric wire processing information of the electric wire at a subsequent process, which is read out by the reading portion in communication with the recording portion, the calculation portion sets an alignment pattern for the electric wire in the parallel direction as the predetermined arrangement pattern, and the calculation portion controls the end treatment portion and the transfer portion and also controls the securing treatment for securing the electric wire in the predetermined arrangement pattern to the securing means in the discharge position.

2. An electric wire end treatment device according to claim 1, wherein:

the parallel direction of the engaging portions and a transfer direction for the electric wire by the transfer portion are substantially identical directions.

3. An electric wire end treatment device according to claim 1 or 2, wherein:

a plurality of discharge chucks, which holds both ends of the electric wire transferred by the transfer portion and performs a discharge treatment at the discharge portion under control of the calculation portion, are provided between the transfer portion and the discharge portion;

the discharge chucks are provided substantially horizontally and parallel in a direction substantially vertical to the transfer direction; and the discharge chucks secure the electric wire to the securing means in a folded state by overlapping and securing the both ends of the electric wire at the same positions in the parallel direction.

4. An electric wire end treatment device according to claim 1, wherein:

an end treatment for each of electric wires by the end treatment portion is controlled by the calculation portion based on the electric wire processing information.

5. An electric wire end treatment device according to claim 1, wherein:

the end treatment portion includes treating means for performing a treatment for the electric wire in accordance with an end treatment pattern; and the treating means is controlled by the calculation portion based on the electric wire processing information.

* * * * *

UNITED STATES PATENT AND TRADEMARK OFFICE
CERTIFICATE OF CORRECTION

| | | |
|---|---|---|
| PATENT NO. | : 8,443,847 B2 | Page 1 of 1 |
| APPLICATION NO. | : 13/230806 | |
| DATED | : May 21, 2013 | |
| INVENTOR(S) | : Naoki Sato et al. | |

It is certified that error appears in the above-identified patent and that said Letters Patent is hereby corrected as shown below:

On the Title Page, in the Related U.S. Application Data at Item (63), Line 2:

Delete "Nov. 19, 2009"

Insert --April 8, 2010--

Signed and Sealed this
Fifteenth Day of April, 2014

Michelle K. Lee
*Deputy Director of the United States Patent and Trademark Office*